US008565315B2

(12) United States Patent
Chikamura et al.

(10) Patent No.: US 8,565,315 B2
(45) Date of Patent: Oct. 22, 2013

(54) IMAGE DECODING DEVICE AND IMAGE DECODING METHOD

(75) Inventors: Keishi Chikamura, Kanagawa (JP); Takashi Hashimoto, Hyogo (JP)

(73) Assignee: Panasonic Corporation, Osaka (JP)

( * ) Notice: Subject to any disclaimer, the term of this patent is extended or adjusted under 35 U.S.C. 154(b) by 630 days.

(21) Appl. No.: 12/743,033

(22) PCT Filed: Nov. 14, 2008

(86) PCT No.: PCT/JP2008/003326
§ 371 (c)(1),
(2), (4) Date: May 14, 2010

(87) PCT Pub. No.: WO2009/063646
PCT Pub. Date: May 22, 2009

(65) Prior Publication Data
US 2010/0239024 A1    Sep. 23, 2010

(30) Foreign Application Priority Data

Nov. 16, 2007   (JP) .................................. 2007-297573

(51) Int. Cl.
*H04N 7/12*      (2006.01)
*H04N 11/02*     (2006.01)

(52) U.S. Cl.
USPC ................. 375/240.23; 375/240.12

(58) Field of Classification Search
USPC ......................................................... 375/240
See application file for complete search history.

(56) References Cited

U.S. PATENT DOCUMENTS

2003/0189571 A1* 10/2003 MacInnis et al. ............. 345/505

2005/0053157 A1* 3/2005 Lillevold .................. 375/240.25
2006/0093043 A1  5/2006 Kashima et al.
2008/0031329 A1* 2/2008 Iwata et al. ............... 375/240.12

FOREIGN PATENT DOCUMENTS

JP    2006-129285    5/2006
JP    2006-345157   12/2006

(Continued)

OTHER PUBLICATIONS

International Search Report issued Mar. 3, 2009 in International (PCT) Application No. PCT/JP2008/003326.

(Continued)

*Primary Examiner* — Sath V Perungavoor
*Assistant Examiner* — Xiaolan Xu
(74) *Attorney, Agent, or Firm* — Wenderoth, Lind & Ponack, L.L.P.

(57) ABSTRACT

To decode coded pictures each of which has dependencies within the picture, using conventional decoding circuits and without deteriorating the efficiency in parallel processing. An image decoding device (100) includes: a stream segmentation unit (110) which segments a bit stream such that each of the coded pictures are segmented into two areas; and decoding processing units (120, 130) each of which decodes a corresponding one of the two segmented bit streams. The respective decoding processing units (120, 130) include: decoding units (123, 133) each of which generates decoded data including pixel data and control data; transfer determination units (124, 134) each of which determines whether or not the decoded data is referred to in another one of the processing units; data transfer units (125, 135) each of which transfers decoded data to the other processing unit; and decoding determination units (122, 132) each of which determines whether or not the decoded data to be referred to has been obtained. Each of the decoding units (123, 133) decodes a corresponding one of the segmented bit streams when reference decoded data has been obtained.

12 Claims, 12 Drawing Sheets

(56) References Cited

FOREIGN PATENT DOCUMENTS

| | | |
|---|---|---|
| JP | 2007-60488 | 3/2007 |
| JP | 2008-42571 | 2/2008 |
| JP | 2008-283612 | 11/2008 |
| JP | 2009-38501 | 2/2009 |
| WO | 2008/020470 | 2/2008 |

OTHER PUBLICATIONS

Kosuke Nishihara et al., "*Kumikomi Multicore Processor Muke H.264 Video Decoder no Heiretsuka (Parallelization of H. 264 Video Decoder for Embedded Multicore Processor)*", Information Processing Society of Japan, Technical Reports, vol. 2007, No. 73, Jul. 19, 2007, pp. 25-30 with its English translation.

Jike Chong et al., "*Efficient Parallelization of H.264 Decoding with Macro Block Level Scheduling*", Proc. of IEEE Conf. on Multimedia and Expo, Jul. 2, 2007, pp. 1874-1877.

ITU-T H.262 (2000 E),"*Information technology—Generic coding of moving pictures and associated audio information: Video*", PP. i-ix, 1-206.

ITU-T H.264 (Mar. 2005), "*Advanced video coding for generic audiovisual services*", pp. i-xiv, 1-324.

\* cited by examiner

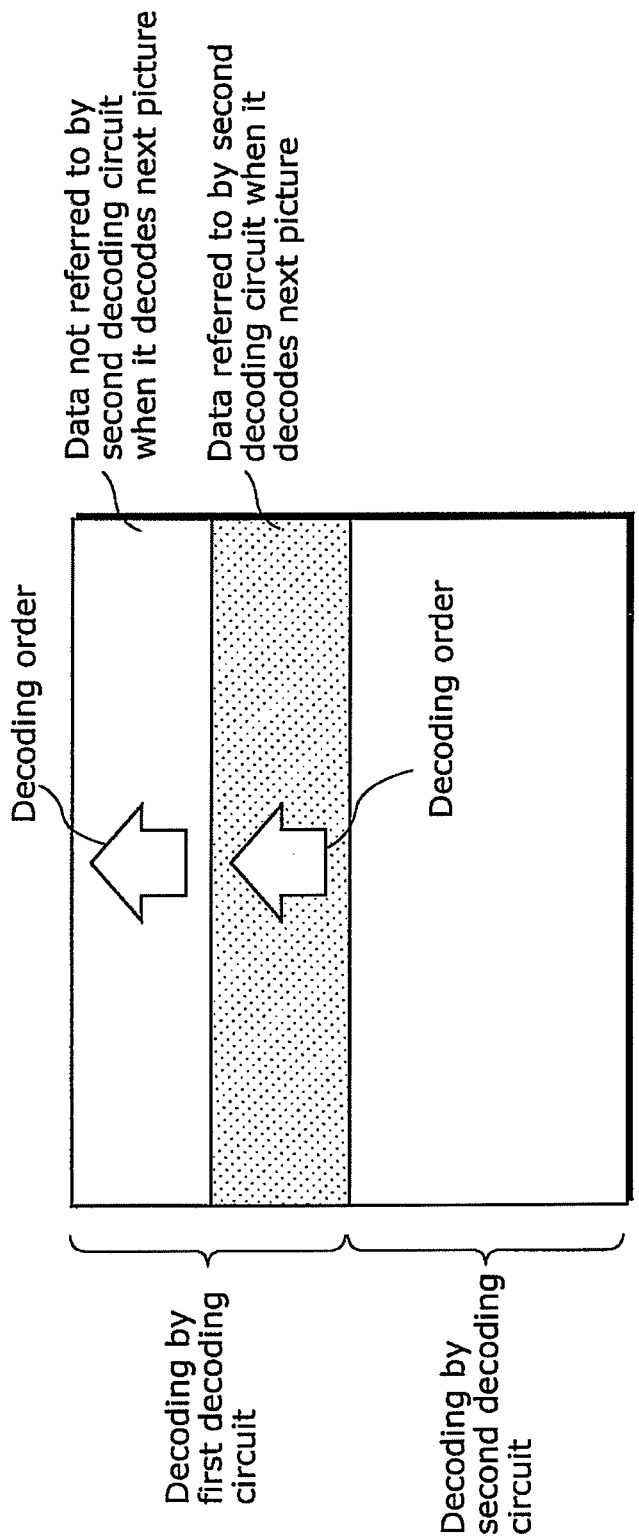

IMAGE DECODING DEVICE AND IMAGE DECODING METHOD

TECHNICAL FIELD

The present invention relates to image decoding devices and image decoding methods for decoding bit streams coded based on intra-picture prediction and inter-picture prediction, and in particular to an image decoding device and image decoding method involving plural decoding units that are mutually connected via a common bus and perform decoding processes in parallel.

BACKGROUND ART

Conventional compression coding (hereinafter, simply referred to as "coding") techniques using differences between pictures include coding techniques defined by the MPEG (Moving Picture Experts Group) (See Non Patent Literature 1). Recently, the H.264 standards (See Non patent Literature 2) for achieving higher compression have been employed as coding standards. As with the conventional MPEG standards, in H.264, coding and decoding are performed in units of a rectangular block called macroblock composed of 16×16 pixels.

As with the conventional MPEG standards, a coding algorithm called inter-picture prediction is used in H.264. In the case of decoding a macroblock on which inter-picture prediction processing needs to be performed, its pixel values are predicted using information of decoded picture(s). Therefore, data of decoded pictures are kept, and referred to as necessary. In contrast, in the case of decoding a macroblock on which intra-picture prediction needs to be performed, the macroblock is decoded using information of a macroblock which immediately precedes a currently being decoded macroblock and information of its adjacent macroblocks each of which is spatially located at the left, top, left top or right top position. Therefore, information of decoded macroblocks within the same picture is kept, and used for decoding the subsequent macroblocks.

Some of the techniques disclose decoding a bit stream coded using coding methods such as the MPEG and H.264 standards as mentioned above by segmenting the bit stream into plural bit streams, and making plural decoding chips decode the respective segmented bit streams. At this time, the decoding chips must mutually transfer the decoded data in order to decode the bit streams, using information of decoded pictures or decoded macroblocks.

For example, Patent Literature 1 has proposed a parallel decoding processing approach performed by a system which segments a bit stream into plural bit streams and decodes the bit streams by plural decoding circuits while mutually transferring data necessary for inter-picture prediction via a bus.

FIG. 12 is a diagram showing the decoding order in a picture that is decoded in parallel by the plural decoding circuits disclosed in Patent Literature 1. In the example shown in the diagram, the picture is segmented into two areas that are a top area and a bottom area, and each of the two areas is decoded by a corresponding one of the first and second decoding circuits. Here, as shown in FIG. 12, the technique disclosed in Patent Literature 1 decodes macroblock lines in a picture sequentially from bottom, whereas, generally, macroblock lines in a picture are decoded sequentially from top.

This makes it possible to prioritize decoding of data that is referred to at the time when the second decoding circuit decodes a next picture, over decoding of data that is not referred to. Accordingly, it is possible to reduce time for waiting data transfer from the first decoding circuit when the second decoding circuit decodes a next picture.

On the other hand, Patent Literature 2 discloses a technique for monitoring a current processing status of macroblocks in a picture, and for processing an object macroblock to be coded in the case where reference macroblocks for the object macroblock have been processed. For example, in the case of performing intra-picture prediction processing, parallel processing is performed by detecting completion of processing of adjacent macroblocks each of which is spatially located at the left, top, left top, or right top position, and assigning each of the macroblocks having complete reference data to a corresponding one of the plural circuits.

CITATION LIST

Patent Literature

[PTL 1]
Japanese Unexamined Laid-open Patent Publication No. 2007-60488
[PTL 2]
Japanese Unexamined Laid-open Patent Publication No. 2006-129285

Non Patent Literature

[NPL 1]
ITU-T Recommendations H.262 "Information technology— Generic coding of moving pictures and associated audio information: Video"
[NPL 2]
ITU-T Recommendations H.264 "Advanced video coding for generic audiovisual services"

SUMMARY OF INVENTION

Technical Problem

However, the aforementioned conventional techniques entail problems indicated below.

The technique disclosed in Patent Literature 1 entails a problem of being not able to decode a coded picture having dependencies within the picture such as a coded picture coded according to H.264.

The technique disclosed in Patent Literature 1 changes the decoding order within the picture such that data to be referred to in decoding another picture is decoded prior to decoding of data not to be referred to, thereby reducing time for waiting transfer of necessary data. This technique is effective to a picture having no dependencies within the picture. Stated differently, the technique disclosed in Patent Literature 1 cannot change the decoding order within a coded picture having dependencies within the coded picture, and thus it cannot decode the coded picture having the dependencies within the picture in parallel by the plural decoding circuits.

In addition, the technique disclosed in Patent Literature 2 entails problems of heavy processing overhead and inefficient parallel processing. Parallel decoding including intra-picture prediction processing according to Patent Literature 2 requires inter-communication between decoding units for checking completion of macroblock processing, and thus data necessary for the parallel decoding must be transferred in units of a macroblock. This is the reason why processing overhead is heavy, worsening the efficiency in parallel processing. In addition, the technique disclosed in Patent Literature 2 entails a problem of difficulty in using conventional decoding circuits because the technique employs decoding procedures significantly different from the procedures taken by the existing decoding circuits. Examples of existing (or conventional) decoding circuits include decoding circuits which decode bit streams coded based on the MPEG-2 standard. Here, each of coded pictures in each of the bit streams does not have any dependencies between different macroblock lines within the picture.

In view of this, the present invention has an object to provide an image decoding device and an image decoding method which allows decoding of coded pictures each of which has dependencies within the picture, using conventional decoding circuits and without deteriorating the efficiency in parallel processing.

Solution to Problem

In order to solve the above-described problems, an image decoding device according to the present invention decodes a bit stream including coded pictures which have been coded based on intra-picture prediction and inter-picture prediction, the image decoding device including: a stream segmentation unit configured to generate N segmented bit streams by segmenting the bit stream such that the coded pictures are segmented into N areas, N being an integer equal to or greater than 2; and N decoding processing units each of which decodes a corresponding one of the N segmented bit streams configured to decode the respective N segmented bit streams generated by the stream segmentation unit, wherein each of the N decoding processing units includes: a decoding unit configured to generate decoded data including pixel data indicating pixel values and control data indicating dependencies between first units of processing included in the N areas of the respective coded pictures by decoding a corresponding one of the N segmented bit streams, based on intra-picture prediction and inter-picture prediction, in the first units of processing, and according to predefined processing orders; a first determination unit configured to determine whether or not the decoded data generated by the decoding unit is referred to by another one of the N decoding processing units, based on the dependencies between the first units of processing indicated by the control data; a data transfer unit configured to send the decoded data in second units of processing to the other decoding processing unit in the case where the first determination unit determines that the other decoding processing unit refers to the decoded data, and to receive decoded data to be sent from the other or another one of the N decoding processing units, the second unit of processing being equal to or larger than the first unit of processing; and a second determination unit configured to determine whether or not decoded data to be referred to based on intra-picture prediction and inter-picture prediction either has been generated by the decoding unit or has been received by the data transfer unit, and wherein the decoding unit is configured to decode the segmented bit stream based on intra-picture prediction and inter-picture prediction by referring to the pixel data of pixels having dependencies with an object first unit of processing, and using the control data included in decoded data, in the case where the second determination unit determines that the decoded data has been generated or received.

The image decoding device configured in this manner is capable of decoding even coded pictures coded based on intra-picture prediction because decoding is started after reception of not only pixel data necessary for inter-picture prediction but also control data indicating dependencies of first units of processing (such as units of decoding processing, for example, macroblocks). In H.264 or the like for example, even in the case where intra-picture dependencies are complicated, and the decoding orders are predefined according to these dependencies, it is possible to perform decoding with determinations on the dependencies based on the control data, on condition that reference data has been obtained.

In addition, it is possible to reduce the number of times of data transfer, thereby reducing the overhead occurred for inter-communication between decoding processing units. Furthermore, it is possible to use existing decoding circuits because of elimination of conventional complicated control such as changing the decoding order.

Not only in the case of inter-picture prediction but also in the case where a coded picture has dependencies based on intra-picture prediction within the coded picture, the image decoding device can decode bit streams including the coded picture having the dependencies within the coded picture, using conventional decoding circuits, and without deteriorating the efficiency in the parallel processing.

In addition, the stream segmentation unit may be configured to generate the N segmented bit streams by segmenting the bit stream such that the coded pictures are segmented into N areas having N−1 horizontal axis as a boundary, and each of the N areas may have a size equal to or greater than a half of a maximum search range in which a motion vector is searched by the decoding processing unit in the decoding based on inter-picture prediction.

The decoded data obtained by one of the decoding processing units in decoding an area in this manner is referred to only by the decoding processing unit which decodes the areas adjacent to this area. Thus, for this, it is only necessary to connect these decoding processing units which decode the adjacent areas to each other. Therefore, it is possible to implement an image decoding device that is simply configured.

In addition, the stream segmentation unit may generate N segmented bit streams by segmenting the bit stream such that the coded pictures are segmented into N areas having N−1 horizontal axis as a boundary. In addition, a first segmented bit stream among the N segmented bit streams may include a first area among the N areas, a second segmented bit stream among the N segmented bit streams may include a second area downward adjacent to the first area, the first decoding processing unit among the N decoding processing units may be configured to decode the first segmented bit stream, the second decoding processing unit among the N decoding processing units may be configured to decode the second segmented bit stream, the data transfer unit included in the second decoding processing unit may be configured to receive at least a part of the decoded data that is obtained by decoding the first area and is sent from the first decoding processing unit, the second determination unit included in the second decoding processing unit may be configured to determine whether or not the decoded data generated by decoding a last first unit of processing in the first area of the coded picture has been received, and the decoding unit included in the second decoding processing unit may be configured to start decoding the second area of the coded picture, in the case where it is determined that the decoded data generated by decoding the last first unit of processing in the first area has been received.

In this way, it is possible to decode coded pictures coded based on intra-picture prediction without performing complex control.

In addition, the first determination unit may be configured to determine that the decoded data generated by the decoding unit is referred to by the other decoding processing unit, in the case where the decoded data includes (i) the control data indicating dependencies with another one of the N areas and (ii) at least one of pixel data of pixels that are referred to based on the dependencies with the other area, when the other decoding processing unit decodes, based on intra-picture prediction, the other area of the coded picture included in another one of the N segmented bit streams.

In this way, this allows the other decoding processing unit to obtain information relating to the dependencies and accurately decode another input segmented bit stream.

In addition, the first determination unit may be configured to determine that the decoded data generated by the decoding unit is referred to by the other decoding processing unit, in the case where the decoded data includes pixel data of pixels located within a search range in which a motion vector is searched, when the other decoding processing unit decodes, based on inter-picture prediction, another one of the N areas of the coded picture included in another one of the N segmented bit streams.

Generally, search ranges for motion vectors are predefined according to the H.264 standards or the like. Thus, in the manner described above, it is possible to determine processing relationships between the decoding processing units and the pixels that may be referred to by the respective decoding processing unit at the time when the coded picture is segmented.

In addition, the second determination unit may be configured to determine whether or not all of the decoded data including (i) the control data indicating dependencies with the object first unit of decoding processing that is decoded by the decoding unit and (ii) at least one of pixel data of the pixels having dependencies with the object first unit of decoding processing either has been generated by the decoding unit or has been received by the data transfer unit.

In this way, decoding starts in the case where all the data having dependencies with the object first unit of decoding processing by the decoding unit (here, the object first unit may be an object block) have been obtained. Therefore, it is possible to prevent a trouble of starting decoding before the reference data is obtained.

In addition, the stream segmentation unit may be configured to generate the N segmented bit streams by segmenting the bit stream such that the coded pictures are segmented into N equal-sized areas.

This makes it possible to approximately equalize the time required for the processes performed by the respective decoding processing units, thereby reducing the time for each of the decoding processing units to wait necessary data transfer.

In addition, the image decoding device may further include a storage unit configured to store the decoded data generated by the decoding unit and the decoded data received by the data transfer unit, wherein the second determination unit may be configured to determine whether or not the decoded data to be referred to based on intra-picture prediction and inter-picture prediction has been stored in the storage unit, and the decoding unit may be configured to decode the bit stream in the case where the second determination unit determines that the decoded data has been stored in the storage unit.

With this, it is possible to store necessary data. This eliminates the need to transfer the same data repeatedly, thereby reducing the time for waiting the data transfer.

In addition, each of the first units of processing may be a macroblock included in the coded picture, and each of the second units of processing may be a macroblock line included in the coded picture.

The use of macroblock line makes it possible to reduce processing overhead compared to the processing overhead occurred in the case of transferring in units of a macroblock, thereby increasing the efficiency in parallel processing.

It is noted that the present invention can be implemented not only as an image decoding device, but also as a method including the steps corresponding to the processing units of the image decoding device. In addition, the present invention can be implemented as a program making a computer execute these steps. Furthermore, the present invention can be implemented as a computer-readable recording medium such as a CD-ROM (Compact Disc-Read Only Memory) on which the program is recorded, as information and data indicating the program, and as a signal representing the program. As a matter of course, these program, information, data, and signal may be distributed via communication networks such as the Internet.

In addition, some or all of the constituent elements of the aforementioned image decoding device may be configured in the form of a single system LSI (Large Scale Integration). A system LSI is a super-multi-functional LSI manufactured by integrating plural constituent elements on a single chip, and specifically, a computer system configured to include a micro processor, a ROM and a RAM (Random Access Memory), and the like.

Advantageous Effects of Invention

Not only in the case of inter-picture prediction but also in the case where a coded picture has dependencies based on intra-picture prediction within the coded picture, the image decoding device and image decoding method according to the present invention allows decoding of bit streams including the coded picture having the dependencies within the coded picture, using conventional decoding circuits and without deteriorating the efficiency in the parallel processing.

BRIEF DESCRIPTION OF DRAWINGS

FIG. 12 is a diagram showing the decoding order in a picture that shows parallel decoding processing performed by the conventional plural decoding circuits.

REFERENCE SIGNS LIST

Figure 1:
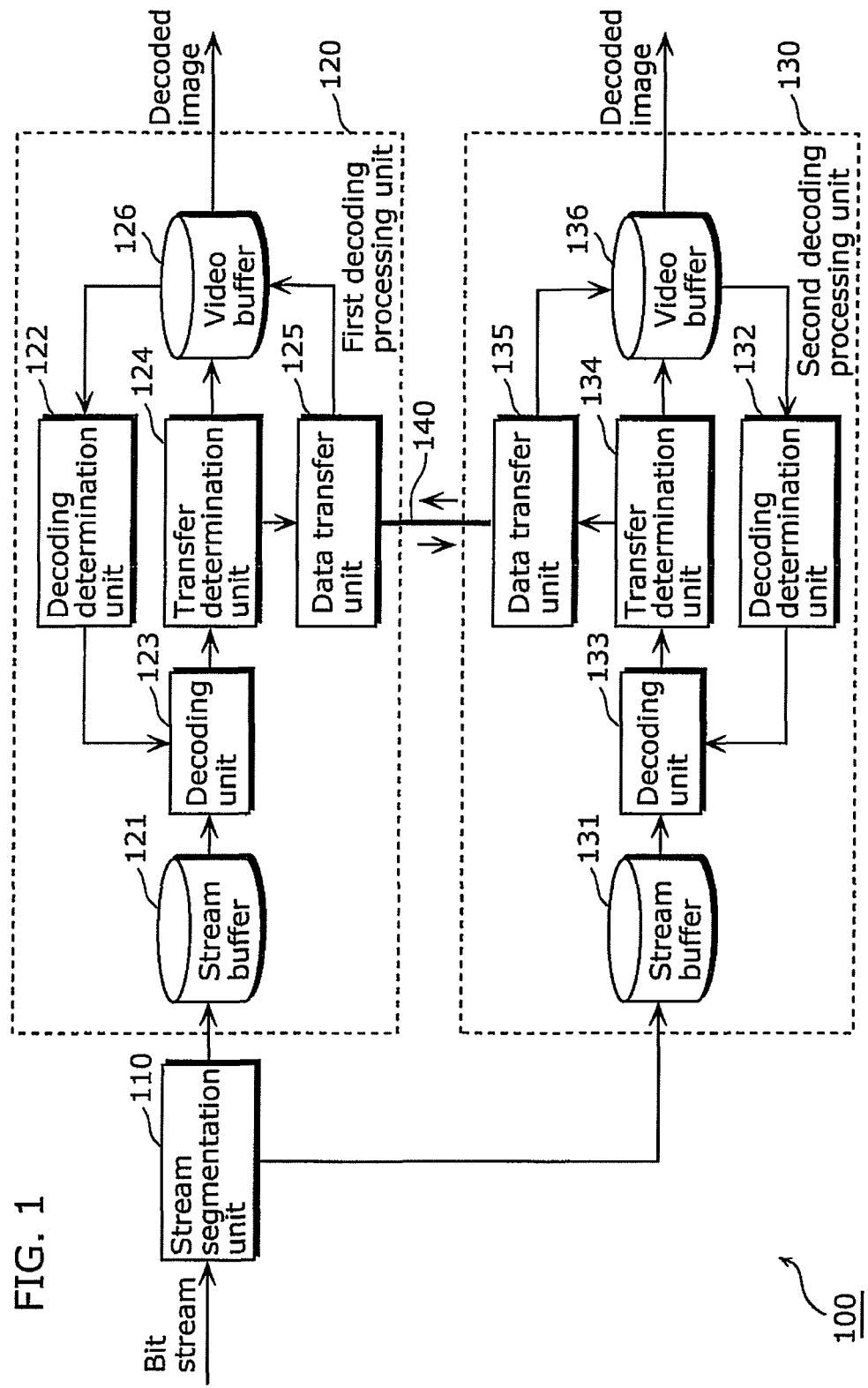
FIG. 1 is a block diagram showing the configuration of an image decoding device according to an embodiment.

100 Image decoding device
110 Stream segmentation unit

120 First decoding processing unit
121, 131 Stream buffer
122, 132 Decoding determination unit
123, 133 Decoding unit
124, 134 Transfer determination unit
125, 135 Data transfer unit
126, 136 Video buffer
130 Second decoding processing unit
140 Data transfer bus
200 Coded picture
201, 201a, 201b, 201c Top half
202, 202a, 202b, 202c Bottom half
200a Intra-coded picture
200b Inter-coded picture
200c Reference picture
301a, 301b, 301c, 303a, 303b, 303c Top portion
302a, 302b, 302c, 304a, 304b, 304c Bottom portion

DESCRIPTION OF EMBODIMENT

An embodiment according to the present invention is described below with reference to the drawings.

An image decoding device according to the present invention makes plural decoding chips decode, in parallel, bit streams including coded pictures coded based on intra-picture prediction and inter-picture prediction. More specifically, the image decoding device segments a bit stream into N segmented bit streams such that each of the coded pictures is segmented into N areas (N is an integer equal to or greater than 2). Next, the image decoding device makes the N decoding chips decode, in parallel, the respective N segmented bit streams. At this time, each of the decoding chips transfers control data indicating dependencies between units of decoding processing (for example, between macroblocks), and determines whether or not all reference data for a corresponding one of object blocks to be decoded has been obtained, and decodes the object block when all the reference data is obtained.

FIG. 1 is a block diagram showing the configuration of an image decoding device 100 according to this embodiment. The image decoding device 100 shown in the diagram includes a stream segmentation unit 110, a first decoding processing unit 120, a second decoding processing unit 130, and a data transfer bus 140.

Figure 2:
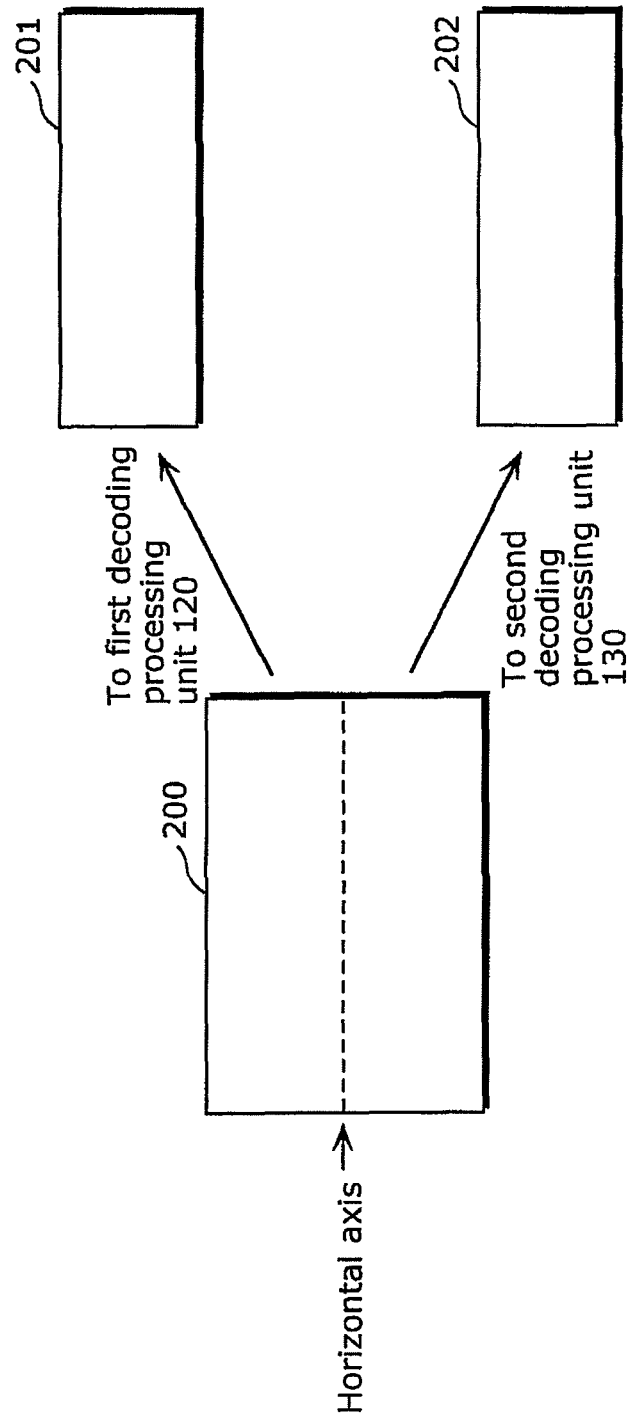
FIG. 2 is a diagram showing a coded picture segmented into two equal-sized areas having a horizontal axis as a boundary.

The stream segmentation unit 110 generates N segmented bit streams by segmenting an input bit stream such that each of the coded pictures included in the bit stream is segmented into N areas. For example, each of the coded pictures is segmented into N areas having an N−1 horizontal axis as a boundary. Each of the coded pictures included in the bit stream is segmented into N areas having a common horizontal axis as a boundary. Each of the segmented bit stream is a stream corresponding to co-located segments of the coded pictures. Here, it is preferable that each of the N areas has a size equal to or greater than the half of a maximum search range that is a maximum area in which a first decoding processing unit 120 or a second decoding processing unit 130 searches a motion vector in decoding based on inter-picture prediction. In addition, it is preferable that each of the N areas has an equal size. As shown in FIG. 2, this embodiment describes a case where N=2 is satisfied.

FIG. 2 is a diagram showing a coded picture segmented into two equal-sized areas having a horizontal axis as a boundary. As shown in the diagram, the coded picture 200 is segmented, along the horizontal axis, into two equal-sized areas that are a top half 201, and a bottom half 202. The segmented bit stream including the top half 201 is sent to the first decoding processing unit 120, and the segmented bit stream including the bottom half 202 is sent to the second decoding processing unit 130.

For example, in the case where the coded picture 200 has a 4096×2048 pixel resolution, according to H.264, the maximum value in the vertical direction for a motion vector corresponds to 512 pixels. Accordingly, the maximum search range in the vertical direction for the motion vector corresponds to 1024 pixels calculated according to 512×2. In this way, the maximum search range for the motion vector is shown, for example, as the number of pixels in the vertical direction. It is preferable that the coded picture 200 is segmented into areas having a size equal to or greater than 512 pixels that correspond to the half of the maximum search range. In FIG. 2, each of the top half 201 and the bottom half 202 is an area corresponding to 4096×1024 pixels.

Returning to FIG. 1, the first decoding processing unit 120 decodes one of the segmented bit streams generated by the stream segmentation unit 110. Here, as shown in FIG. 2, the coded picture 200 is horizontally segmented into two areas. The first decoding processing unit 120 decodes the segmented bit stream including the top half 201 of the coded picture 200. As shown in FIG. 1, the first decoding processing unit 120 includes a stream buffer 121, a decoding determination unit 122, a decoding unit 123, a transfer determination unit 124, a data transfer unit 125, and a video buffer 126.

The stream buffer 121 is a memory or the like configured to store the segmented bit stream including the top half 201 of the coded picture 200 among the two bit streams generated by the stream segmentation unit 110.

The decoding determination unit 122 determines whether decoded data referred to by the decoding unit 123 in decoding based on intra-picture prediction and inter-picture prediction has been generated, or received from another one of the decoding processing units (here, the second decoding processing unit 130). As will be described later, the decoding unit 123 generates pixel data indicating pixel values and control data indicating dependencies between predetermined units of processing by decoding the predetermined units of processing (such as macroblocks). The decoding determination unit 122 determines whether or not all decoded data (reference data) including the control data indicating dependencies with an object block to be decoded and at least one of pixel data of pixels having dependencies with the object block has been generated or received. More specifically, the decoding determination unit 122 determines whether or not the reference data has been stored in the video buffer 126.

In an example using intra-picture prediction, the reference data is pixel data indicating pixel values of blocks each of which is located at the left, top, left top, or right top position in the object block, and control data indicating a prediction direction and the like. In an example using inter-picture prediction, the reference data is pixel data indicating pixel values of the respective pixels of previously decoded pictures. More specifically, the reference data is pixel values of pixels included in the search range used for searching a motion vector for the object block. In H.264, it is also possible to estimate a motion vector for an object block by utilizing a motion vector for a block adjacent to the object block and a motion vector in a reference image that has been decoded. In this case, the decoded data to be referred to includes control data indicating dependencies between the object block and other blocks. More specifically, control data corresponds to syntax elements included in a bit stream. Examples of the syntax elements include a part of various parameter sets such as header information, and information that is derived using the parameter sets and header information.

The decoding unit 123 reads out segmented bit streams from the stream buffer 121, and decodes the read-out segmented bit streams, based on intra-picture prediction and inter-picture prediction, and in predefined orders on a predetermined unit of processing basis. In this way, the decoding unit 123 generates pixel data including the pixel values and control data indicating dependencies between units of processing.

More specifically, in the case where the decoding determination unit 122 determines that decoded data to be referred to has been stored in the video buffer 126, the decoding unit 123 reads out the decoded data to be referred to from the video buffer 126, and decodes the segmented bit streams by referring to the pixel data of the pixels each of which has dependencies with an object unit of decoding processing, using control data included in the read-out decoded data.

It is noted that examples of predetermined units of processing include a pixel, a macroblock, and a slice that make up a segmented area of a coded picture. Here, the decoding unit 123 decodes the coded picture in units of a macroblock composed of 16×16 pixels, for example. In addition, a predefined order is a coding order of macroblocks. For example, the decoding unit 123 sequentially decodes the macroblocks starting with the left top macroblock and along the macroblock line. When decoding of a macroblock line is completed, the macroblocks in the next macroblock line are sequentially decoded starting with the leftmost macroblock. It is noted that the decoding unit 123 decodes the macroblocks after sequentially decoding the picture header and slice headers.

The transfer determination unit 124 determines, based on dependencies of each unit of processing indicated by control data, whether or not the decoded data generated by the decoding unit 123 is referred to by the other decoding processing unit (here, the second decoding processing unit 130). The transfer determination unit 124 stores the decoded data generated by the decoding unit 123 into the video buffer 126, and in the case where the decoded data is determined to be referred to by the other decoding unit, sends the decoded data also to the data transfer unit 125.

More specifically, the transfer determination unit 124 determines that decoded data having a possibility of being referred to in decoding performed by the second decoding processing unit 130 is reference decoded data. Here is an example case where the other decoding processing unit (here, the second decoding processing unit 130) decodes, based on intra-picture prediction, another one of the areas (here, a bottom half 202) of a coded picture included in another one of the segmented bit streams. In this example, the transfer determination unit 124 determines that the decoded data generated by the decoding unit 123 is referred to in the case where the decoded data includes control data indicating dependencies with the other area and at least one of pixel data of pixels to be referred to based on the dependencies with the other area.

In addition, the transfer determination unit 124 determines that object decoded data is to be referred to in the case where the decoded data generated by the decoding unit 123 includes pixel data of pixels located in a motion vector search range in decoding by the other decoding processing unit (here, the second decoding processing unit 130), based on inter-picture prediction on the other area (here, the bottom half 202) of the coded picture included in the other segmented bit stream. At this time, a motion vector search range is determined, for example, based on the resolution of the coded picture obtained when the decoding unit 123 decodes the picture header.

The data transfer unit 125 sends the decoded data that the transfer determination unit 124 has determined to be referred to by the other decoding processing unit (here, the second decoding processing unit 130), to the other decoding processing unit (here, the second decoding processing unit 130) in units of transfer processing that is equal to or larger than the units of decoding processing via the data transfer bus 140. Next, the decoded data that is sent from the other decoding processing unit (here, the second decoding processing unit 130) is received via the data transfer bus 140. The unit of transfer processing is a macroblock line, for example.

The data transfer unit 125 may include a buffer for storing decoded data corresponding to a macroblock line. Instead of including such buffer, the data transfer unit 125 may read out decoded data of an object that is a macroblock line to be transferred from the video buffer 126, and transfer it.

The video buffer 126 is a memory or the like configured to store decoded data generated by the decoding unit 123 and decoded data received by the data transfer unit 125.

The second decoding processing unit 130 decodes one of the segmented bit streams generated by the stream segmentation unit 110. Here, as shown in FIG. 2, the coded picture 200 is horizontally segmented into two areas. The second decoding processing unit 130 decodes the segmented bit stream including the bottom half 202 of the coded picture 200. As shown in FIG. 1, the second decoding processing unit 130 includes a stream buffer 131, a decoding determination unit 132, a decoding unit 133, a transfer determination unit 134, a data transfer unit 135, and a video buffer 136.

The stream buffer 131 is a memory or the like configured to store the segmented bit stream including the bottom half 202 of the coded picture 200 among the two bit streams generated by the stream segmentation unit 110.

The decoding determination unit 132 determines whether decoded data that is referred to by the decoding unit 133 in decoding based on intra-picture prediction and inter-picture prediction has been generated, or received from the other decoding processing unit (here, the first decoding processing unit 120). As will be described later, the decoding unit 133 generates pixel data indicating pixel values and control data indicating dependencies between predetermined units of processing by decoding the predetermined units of processing (such as macroblocks). The decoding determination unit 132 determines whether or not all decoded data (reference data) including the control data indicating dependencies with an object block to be decoded and at least one of pixel data of pixels each of which has dependencies with the object block to be decoded has been generated or received. More specifically, the decoding determination unit 132 determines whether or not the reference data has been stored in the video buffer 136.

For example, in the case where the coded picture 200 is horizontally segmented into two areas as shown in FIG. 2, the decoding determination unit 132 determines whether or not the last block in the top half 201 has been received by the data transfer unit 135.

The decoding unit 133 reads out segmented bit streams from the stream buffer 131, and decodes the read-out segmented bit streams, based on intra-picture prediction and inter-picture prediction, and in predefined orders on a predetermined unit of processing basis. In this way, the decoding unit 133 generates pixel data indicating the pixel values and control data indicating dependencies between units of processing.

More specifically, in the case where the decoding determination unit 132 determines that decoded data to be referred to has been stored in the video buffer 136, the decoding unit 133 reads out the decoded data to be referred to from the video buffer 136, and decodes the segmented bit streams referring to the pixel data of the pixels each of which has dependencies with an object unit of decoding processing, using control data included in the read-out decoded data.

It is noted that examples of predetermined units of processing include a pixel, a macroblock, and a slice that make up a segmented area of a coded picture. Here, the decoding unit 133 decodes the coded picture in units of a macroblock composed of 16×16 pixels, for example. In addition, a predefined order is a coding order of macroblocks. For example, the decoding unit 133 sequentially decodes the macroblocks starting with the left top macroblock and along the macroblock line. When decoding of a macroblock line is completed, the macroblocks in the next macroblock line are sequentially decoded starting with the leftmost macroblock.

Here is an example case where the coded picture 200 is horizontally segmented into two areas as shown in FIG. 2. In this case, in the case where the decoding determination unit 132 determines that the decoded data that is generated by decoding the last block in the top half 201 has been received, the decoding unit 133 starts decoding the bottom half 202 of the coded picture 200.

The transfer determination unit 134 determines, based on dependencies of each unit of processing indicated by control data, whether or not the decoded data generated by the decoding unit 133 is referred to by the other decoding processing unit (here, the first decoding processing unit 120). The transfer determination unit 134 stores the decoded data generated by the decoding unit 133 into the video buffer 136, and in the case where the decoded data is determined to be reference data for the decoding unit 134, sends the decoded data also to the data transfer unit 135.

More specifically, the transfer determination unit 134 determines that decoded data having a possibility of being referred to in decoding performed by the first decoding processing unit 120 is reference decoded data. Here is an example case where the other decoding processing unit (here, the first decoding processing unit 120) decodes, based on intra-picture prediction, another one of the areas (here, a top half 201) of a coded picture included in another one of the segmented bit streams. In this example, the transfer determination unit 134 determines that the decoded data generated by the decoding unit 133 is referred to in the case where the decoded data includes control data indicating dependencies with the other area and at least one of pixel data of pixels to be referred to based on the dependencies with the other area.

In addition, the transfer determination unit 134 determines that object decoded data is referred to in the case where the decoded data generated by the decoding unit 133 includes pixel data of pixels located in a motion vector search range in decoding by the other decoding processing unit (here, the first decoding processing unit 120), based on inter-picture prediction, the other area (here, the top half 201) of the coded picture included in the other segmented bit stream. At this time, the motion vector search range is determined, for example, based on the resolution of the coded picture obtained when the decoding unit 133 decodes the picture header.

The data transfer unit 135 sends the decoded data that the transfer determination unit 134 has determined to be referred to by the other decoding processing unit (here, the first decoding processing unit 120), to the other decoding processing unit, in units of processing that is equal to or larger than the units of decoding processing via the data transfer bus 140. Next, the decoded data that is sent from the other decoding processing unit (here, the first decoding processing unit 120) is received via the data transfer bus 140. The unit of transfer processing is a macroblock line, for example.

The data transfer unit 135 may include a buffer for storing decoded data corresponding to a macroblock line. Without such buffer, the data transfer unit 135 may read out decoded data corresponding to an object macroblock to be transferred from the video buffer 136, and transfer it.

The video buffer 136 is a memory or the like configured to store decoded data generated by the decoding unit 133 and decoded data received by the data transfer unit 135.

The data transfer bus 140 connects the data transfer unit 125 and the data transfer unit 135 for mutual data transfer. In the case where the image decoding device 100 according to this embodiment further includes another decoding processing unit, the data transfer unit included in the other decoding processing unit is also connected thereto for enabling data transfer between the data transfer units.

The image decoding device 100 in this embodiment configured in this manner segments a bit stream into plural segmented bit streams, and makes the respective decoding processing units decode the corresponding segmented bit streams while mutually transferring decoded data. At this time, the image decoding device 100 transfers control data indicating dependencies between blocks, in addition to pixel data, and decodes an object block while determining that all reference data for the object block have been obtained.

Next, a description is given of dependencies within a coded picture coded based on intra-picture prediction. The following description is given taking, as an example, an intra-coded picture including only intra-macroblocks coded based on intra-picture prediction. It is noted that a picture including such intra-macroblocks and inter-macroblocks coded based on inter-picture prediction also has dependencies indicated below. In addition, in the case where deblocking filtering processing is performed in decoding a picture, the decoded data of the macroblock line located immediately-above is also required. This is the same for a picture including only inter-macroblocks.

Figure 3:
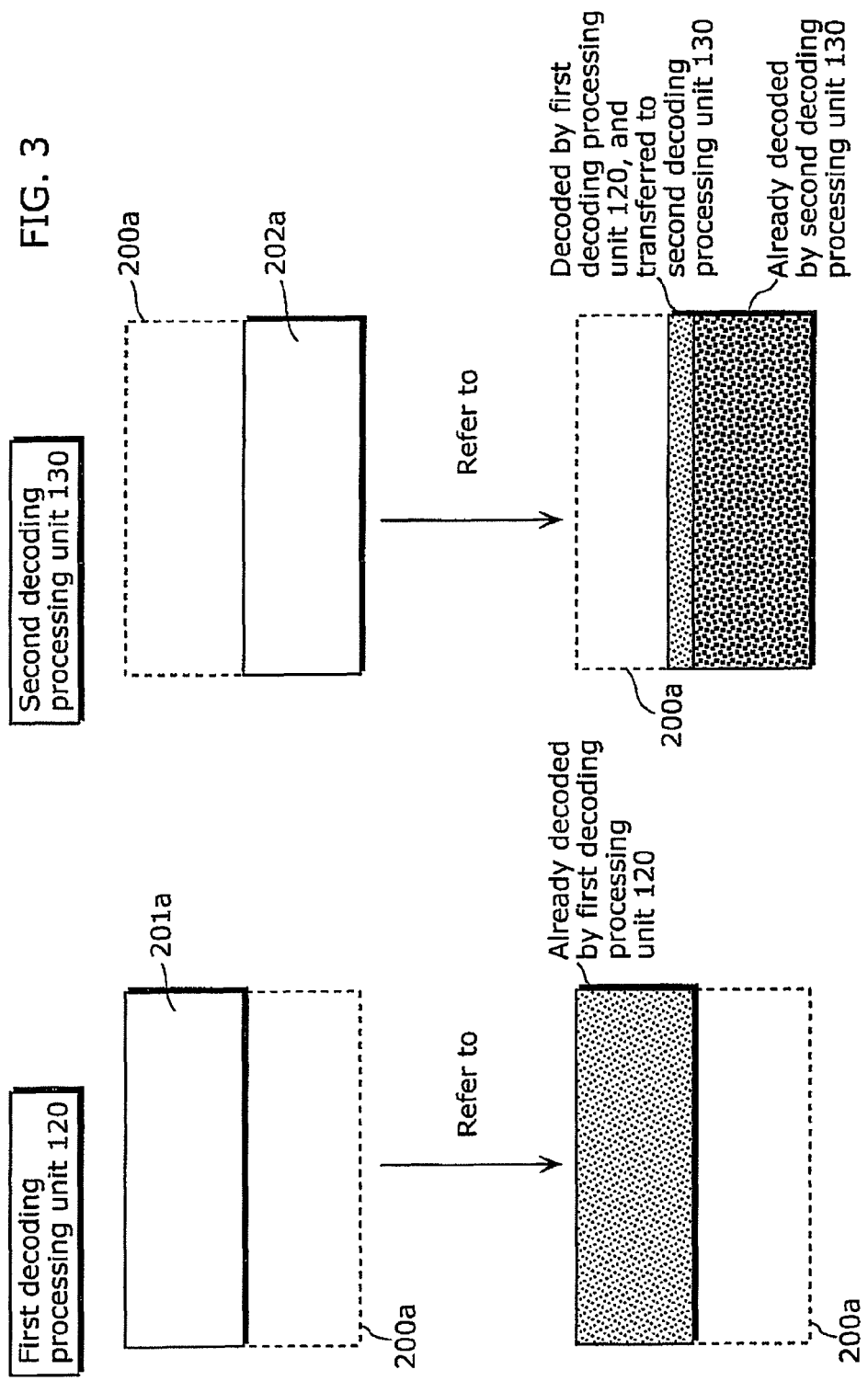
FIG. 3 is a diagram showing reference relationships within each of pictures based on intra-picture prediction.

FIG. 3 is a diagram showing reference relationships within each of pictures based on intra-picture prediction. The first decoding processing unit 120 decodes the top half 201*a* of an intra-coded picture 200*a*, and the second decoding processing unit 130 decodes the bottom half 202*a* of the intra-coded picture 200*a*.

The first decoding processing unit 120 sequentially decodes the macroblocks in the top half 201*a* of the intra-coded picture 200*a*, starting with the left top macroblock. In H.264, an object block is decoded by referring to blocks each of which is located at the left, top, left top, or right top position with respect to the object block within the picture including the object block. Here is an example case where there are no blocks located at the top, left top and right top positions as in the case of the macroblock included in the highest macroblock line in the top half 201*a*. In this case, it is noted that the object block is coded by referring to only the left side block, and thus that the object block can be decoded by referring to the left side block only.

Accordingly, the first decoding processing unit 120 can decode the whole top half 201*a* of the intra-coded picture 200*a*, by referring to the blocks decoded by the first decoding processing unit 120. For this, no decoded data is required to be received from the other decoding processing unit.

The second decoding processing unit 130 sequentially decodes the macroblocks in the bottom half 202*a* of the intra-coded picture 200*a*, starting with the left top macroblock. The highest macroblock line in the bottom half 202*a* is decoded by referring to the blocks included in the macroblock line immediately above. However, the immediately-above macroblock line is included in the top half 201a of the intra-coded picture 200a, and therefore is decoded by the first decoding unit 120.

Thus, the first decoding processing unit 120 must transfer, to the second decoding processing unit 130, decoded data corresponding to the lowest macroblock line in the top half 201a of the intra-coded picture 200a. It is noted that the second decoding processing unit 130 can decode the macroblock line in the second and subsequent macroblock lines by referring to the blocks decoded by the second decoding processing unit 130.

As described above, in the case of horizontally segmenting the intra-coded picture 200a into two areas (the top half 201a and the bottom half 202a), and decoding the two areas, it is necessary that the first decoding processing unit 120 transfer, to the second decoding processing unit 130, decoded data corresponding to the lowest macroblock line in the top half 201a so that the second decoding processing unit 130 can start decoding the bottom half 202a. This is because there are dependencies (that are, reference relationships) between the blocks within the intra-coded picture.

Next, a description is given of dependencies between a coded picture (inter-coded picture) coded based on inter-picture prediction and a reference picture. An inter-coded picture is a picture including only inter-macroblocks, or a picture including intra-macroblocks and inter-macroblocks.

Figure 4:
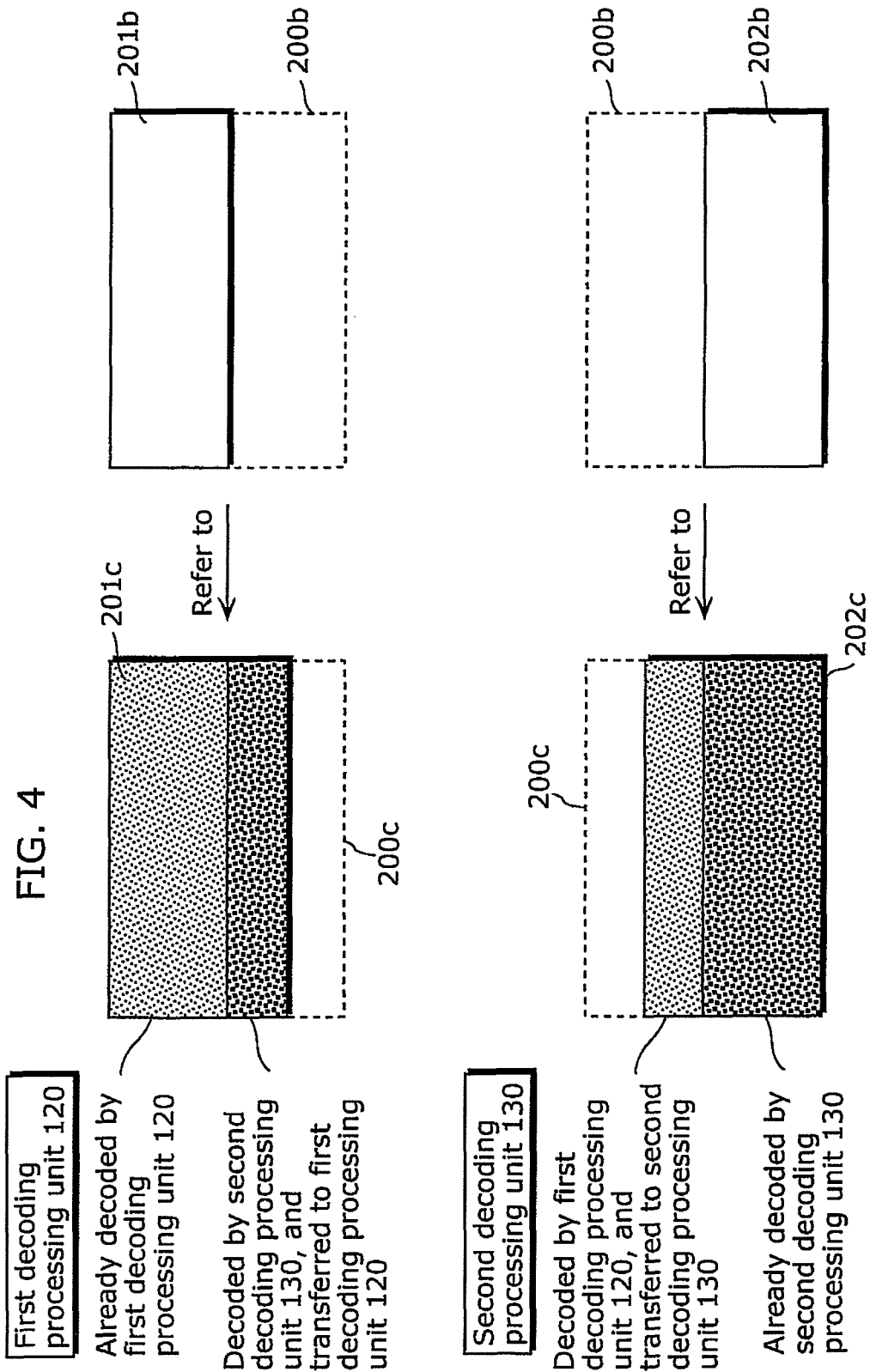
FIG. 4 is a diagram showing reference relationships within each of pictures based on inter-picture prediction.

FIG. 4 is a diagram showing reference relationships within each of pictures based on inter-picture prediction. The first decoding processing unit 120 decodes a top half 201b of an inter-coded picture 200b, and the second decoding processing unit 130 decodes a bottom half 202b of the inter-coded picture 200b.

A reference picture 200c is a picture coded based on either intra-picture prediction or inter-picture prediction, and is decoded prior to the inter-coded picture 200b according to a decoding order (coding order). The first decoding processing unit 120 has decoded a top half 201c in the reference picture 200c, and the second decoding processing unit 130 has decoded a bottom half 202c of the reference picture 200c.

The first decoding processing unit 120 sequentially decodes the macroblocks in the top half 201b of the inter-coded picture 200b, starting with the left top macroblock. At this time, the first decoding processing unit 120 estimates a motion vector, based on inter-picture prediction by referring to the reference picture 200c that has been decoded earlier. Generally, possible motion vector values are defined according to the H.264 standards or the like. Therefore, in many cases, a part of the reference picture 200c instead of the whole reference picture 200c is referred to in decoding the top half 201b. Thus, among the decoded data corresponding to the areas necessary for inter-picture prediction, the second decoding processing unit 130 sends the decoded data generated by the second decoding processing unit 130 to the first decoding processing unit 120.

For example, in the case where the inter-coded picture 200b has a 4096×2048 pixel resolution, according to H.264, the maximum value in the vertical direction for a motion vector is defined to be 512 pixels. Accordingly, as shown in FIG. 4, the data required to decode the top half 201b based on inter-picture prediction are the top half 201c of the reference picture 200c and the pixel lines from the top pixel line to the 512th pixel line from the top pixel line in the bottom half 202c of the reference picture 200c. The top half 201c of the reference picture 200c has been decoded by the first decoding processing unit 120. The pixel lines from the top pixel line to the 512th pixel line from the top pixel line in the bottom half 202c of the reference picture 200c has been decoded by the second decoding processing unit 130 and is sent to the first decoding processing unit 120.

The second decoding processing unit 130 sequentially decodes the macroblocks in the bottom half 202b of the inter-coded picture 200b, starting with the left top macroblock. As with the earlier case, in many cases, a part of the reference picture 200c instead of the whole area of the reference picture 200c is referred to in decoding the bottom half 202b. Thus, among the decoded data in an area necessary for inter-picture prediction, the first decoding processing unit 120 sends the decoded data generated by the first decoding processing unit 120 to the second decoding processing unit 130.

In the case where the inter-coded picture 200b has a resolution of 4096×2048 pixels, the data required to decode the bottom half 202b based on inter-picture prediction are the bottom half 202c of the reference picture 200c and the pixel lines from the bottom pixel line to the 512th pixel line from the bottom pixel line in the top half 201c of the reference picture 200c. The bottom half 202c of the reference picture 200c has been decoded by the second decoding processing unit 130, and the pixel lines from the bottom pixel line to the 512th pixel line from the bottom pixel line in the top half 201c of the reference picture 200c has been decoded by the first decoding processing unit 120 and is sent to the second decoding processing unit 130.

As described above, the decoding processing units mutually send decoded data corresponding to the areas in motion vector search ranges according to standards such that the decoded data are stored in the video buffer 126 or 136. In other words, each of the transfer determination unit 124 and 134 can determine whether or not to transfer the decoded data generated by the other decoding unit 123 or 133 by determining whether or not the decoded data is included in the area corresponding to one of the motion vector search ranges.

It is noted that information such as a resolution of a picture is obtained by decoding the picture header. Accordingly, since the decoding unit 123 decodes the picture header, the first decoding processing unit 120 can obtain information relating to the resolution, and based on the information, each of the decoding determination unit 122 and the transfer determination unit 124 performs determination processing.

Figure 5:
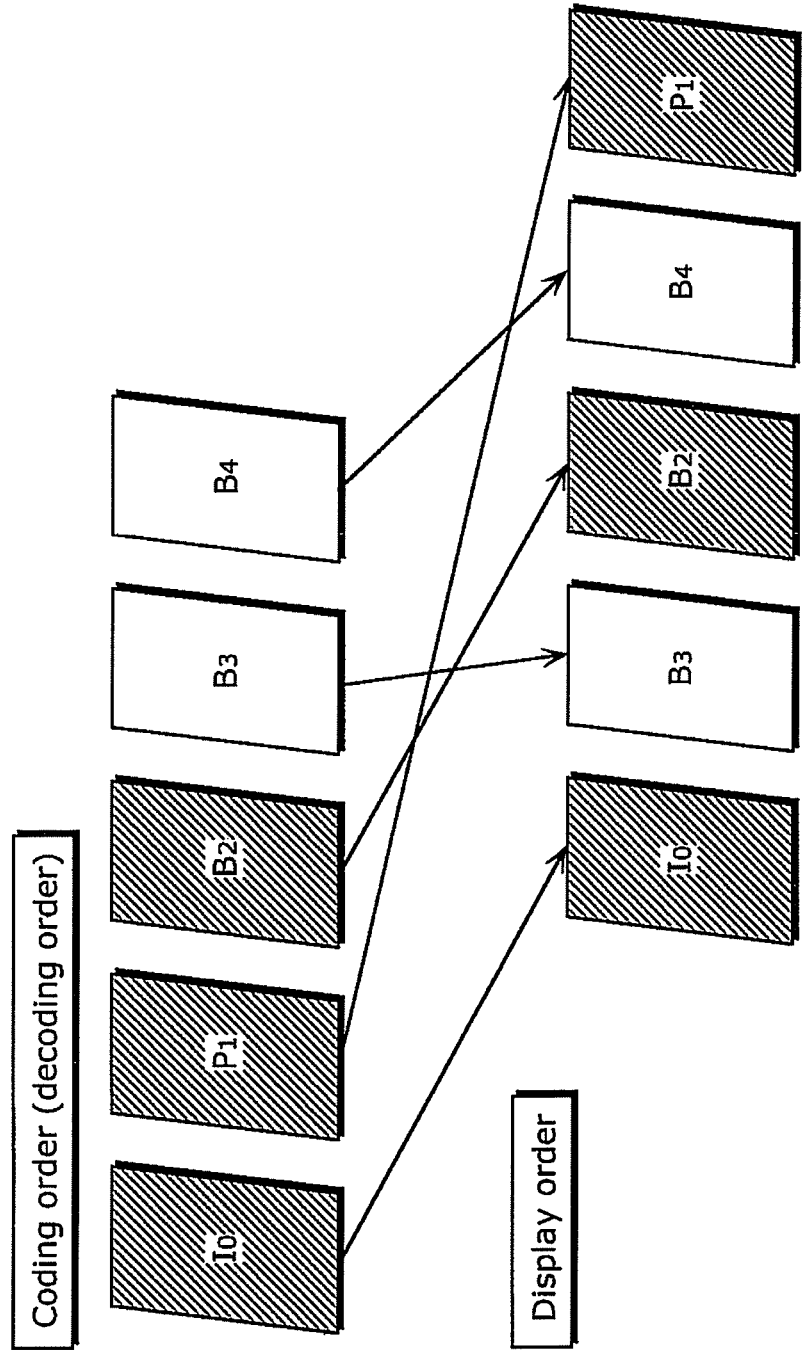
FIG. 5 is a diagram showing a coding order (decoding order) and a display order of pictures.

Next, a description is given of a temporal flow of decoding a bit stream as shown in FIG. 5.

FIG. 5 is a diagram showing a coding order (decoding order) and a display order of pictures. In the diagram, "I" denotes an I-picture, that is, an intra-coded picture. "P" denotes a P-picture, that is, an inter-coded picture coded based on a single direction prediction (generally, a forward direction prediction). "B" denotes a B-picture, that is, an inter-coded picture coded based on a bi-direction prediction. For simplicity, hereinafter, it is assumed, that a P-picture includes only P-slices, and a B-picture includes only B-slices. For example, a picture $P_1$ refers to a picture $I_0$, and a picture $B_2$ refers to pictures $I_0$ and $P_1$.

The following description is given taking an example case where a coded picture has a resolution of 4096×2048 pixels, and the maximum value in the vertical direction for a motion vector corresponds to 512 pixels.

Figure 6:
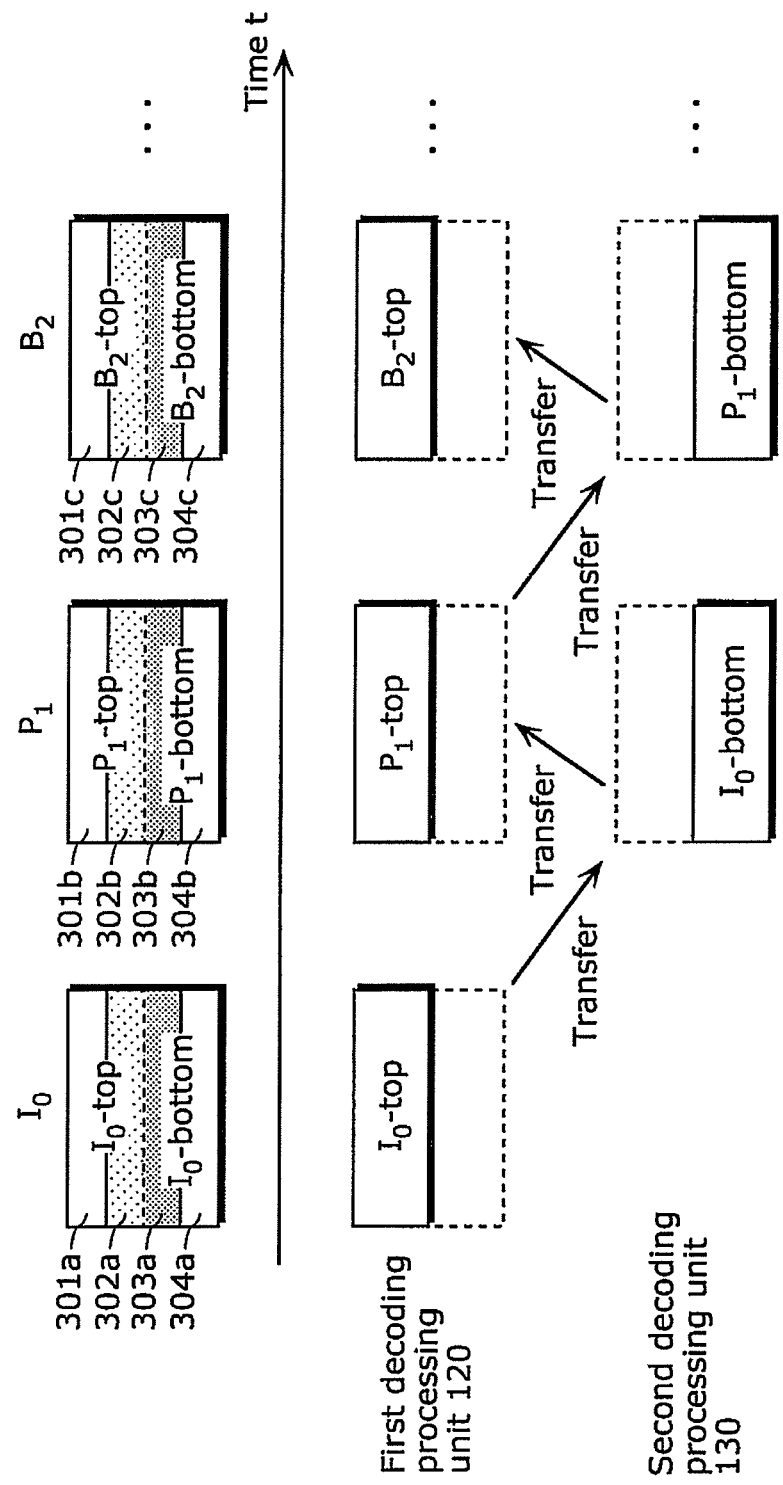
FIG. 6 is a diagram schematically showing a temporal flow of decoding processing in the case where each of pictures is segmented into two areas.

FIG. 6 is a diagram schematically showing a temporal flow of decoding processing in the case where each of pictures is segmented into two areas. As shown in the diagram, the first decoding processing unit 120 decodes a segmented bit stream including only the top halves ($I_0$-top, $P_1$-top, $B_2$-top, . . . ) of the coded pictures. The second decoding processing unit 130 decodes a segmented bit stream including only the bottom halves ($I_0$-bottom, $P_1$-bottom, $B_2$-bottom, . . . ) of the coded pictures.

The top portion 301a in the $I_0$-top is an area corresponding to the pixel lines from the top pixel line to the 512th pixel line from the top pixel line in the $I_0$-top. The top portion 301a is decoded by the first decoding processing unit 120.

The bottom portion 302a in the $I_0$-top is an area corresponding to the pixel lines from the bottom pixel line to the 512th pixel line from the bottom pixel line in the $I_0$-top. The bottom portion 302a is an area that is referred to by the second decoding processing unit 130 in decoding the pictures $P_1$ and $B_2$ and the like. The bottom portion 302a is decoded by the first decoding processing unit 120, and the decoded data resulting from the decoding is transferred to the second decoding processing unit 130.

The top portion 303a in the $I_0$-bottom is an area corresponding to the pixel lines from the top pixel line to the 512th pixel line from the top pixel line in the $I_0$-bottom. The top portion 303a is an area that the first decoding processing unit 120 refers to when decoding the pictures $P_1$ and $B_2$ and the like. The top portion 303a is decoded by the second decoding processing unit 130, and the decoded data resulting from the decoding is transferred to the first decoding processing unit 120.

The bottom portion 304a in the $I_0$-bottom is an area corresponding to the pixel lines from the bottom pixel line to the 512th pixel line from the bottom pixel line in the $I_0$-bottom. The bottom portion 304a is decoded by the second decoding processing unit 130.

The top portion 301b in the $P_1$-top is an area corresponding to the pixel lines from the top pixel line to the 512th pixel line from the top pixel line in the $P_1$-top. The top portion 301b is decoded by the first decoding processing unit 120 by referring to the $I_0$-top (the top portion 301a and the bottom portion 302a).

The bottom portion 302b in the $P_1$-top is an area corresponding to the pixel lines from the bottom pixel line to the 512th pixel line from the bottom pixel line in the $P_1$-top. The bottom portion 302b is an area that is referred to by the second decoding processing unit 130 in decoding the $B_2$ picture and the like. The bottom portion 302b is decoded by the first decoding processing unit 120 by referring to $I_0$-top (including the top portion 301a and the bottom portion 302a) and the top portion 303a of the $I_0$-bottom. The decoded data resulting from the decoding is transferred to the second decoding processing unit 130.

The top portion 303b in the $P_1$-bottom is an area corresponding to the pixel lines from the top pixel line to the 512th pixel line from the top pixel line in the $P_1$-bottom. The top portion 303b is an area that is referred to by the first decoding processing unit 120 in decoding the $B_2$ picture and the like. The top portion 303b is decoded by the second decoding processing unit 130 by referring to the bottom portion 302a in the $I_0$-top and the $I_0$-bottom (the top portion 303a and the bottom portion 304a), and the decoded data resulting from the decoding is transferred to the first decoding processing unit 120.

The bottom portion 304b in the $P_1$-bottom is an area corresponding to the pixel lines from the bottom pixel line to the 512th pixel line from the bottom pixel line in the $P_1$-bottom. The bottom portion 304b is decoded by the second decoding processing unit 130 by referring to the $I_0$-bottom (the top portion 303a and the bottom portion 304a).

The top portion 301c in the $B_2$-top is an area corresponding to the pixel lines from the top pixel line to the 512th pixel line from the top pixel line in the $P_1$-top. The top portion 301c is decoded by the first decoding processing unit 120 by referring to the $I_0$-top (the top portion 301a and the bottom portion 302a) and the $P_1$-top (the top portion 301b and the bottom portion 302b).

The bottom portion 302c in the $B_2$-top is an area corresponding to the pixel lines from the bottom pixel line to the 512th pixel line from the bottom pixel line in the $B_2$-top. The bottom portion 302c is decoded by the first decoding processing unit 120 by referring to the $I_0$-top (the top portion 301a and the bottom portion 302a), the top portion 303a in the $I_0$-bottom, the $P_1$-top (the top portion 301b and the bottom portion 302b), and the top portion 303b in the $P_1$-bottom.

The top portion 303c in the $B_2$-bottom is an area corresponding to the pixel lines from the top pixel line to the 512th pixel line from the top pixel line in the $B_2$-bottom. The top portion 303c is decoded by the second decoding processing unit 130 by referring to the bottom portion 302a in the $I_0$-top, the $I_0$-bottom (the top portion 303a and the bottom portion 304a), the bottom portion 302b in the $P_1$-top, and the $P_1$-bottom (the top portion 303b and the bottom portion 304b).

The bottom portion 304c in the $B_2$-bottom is an area corresponding to the pixel lines from the bottom pixel line to the 512th pixel line from the bottom pixel line in the $B_2$-bottom. The bottom portion 304b is decoded by the second decoding processing unit 130 by referring to the $I_0$-bottom (the top portion 303a and the bottom portion 304a), and the $P_1$-bottom (the top portion 303b and the bottom portion 304b).

As described above, the second decoding processing unit 130 in this embodiment requires decoded data corresponding to the lowest macroblock line in the $I_0$-top so that it can start decoding the $I_0$-bottom. Accordingly, the second decoding processing unit 130 starts decoding the $I_0$-bottom on receiving the lowest decoded data in the $I_0$-top sent from the first decoding processing unit 120. For this, as shown in FIG. 6, the first decoding processing unit 120 and the second decoding processing unit 130 make decoding starting timings different by time required to decode a half of a picture.

Accordingly, the $I_0$-top and the $I_0$-bottom are decoded by the different decoding processing units with different decoding time. Likewise, the $P_1$-top and the $P_1$-bottom, and $B_2$-top and $B_2$-bottom are decoded in pipeline processing by the different decoding processing units with different decoding time.

In addition, in the case where deblocking filtering processing is performed in decoding an object macroblock, the decoded data of the macroblock line located immediately-above is also required. For this, for example, decoded data of the bottom portion 302b in the $P_1$-top is required to decode the top portion 303b in the $P_1$-bottom. Therefore, decoding of the top portion 303b in the $P_1$-bottom can start only when the decoded data of the bottom portion 302b in the $P_1$-top has been transferred. Decoding of the top portion 303c in the $B_2$-bottom is performed in the similar manner. In addition, decoding of a P-picture or a B-picture including an intra slice is performed in the similar manner.

Figure 7:
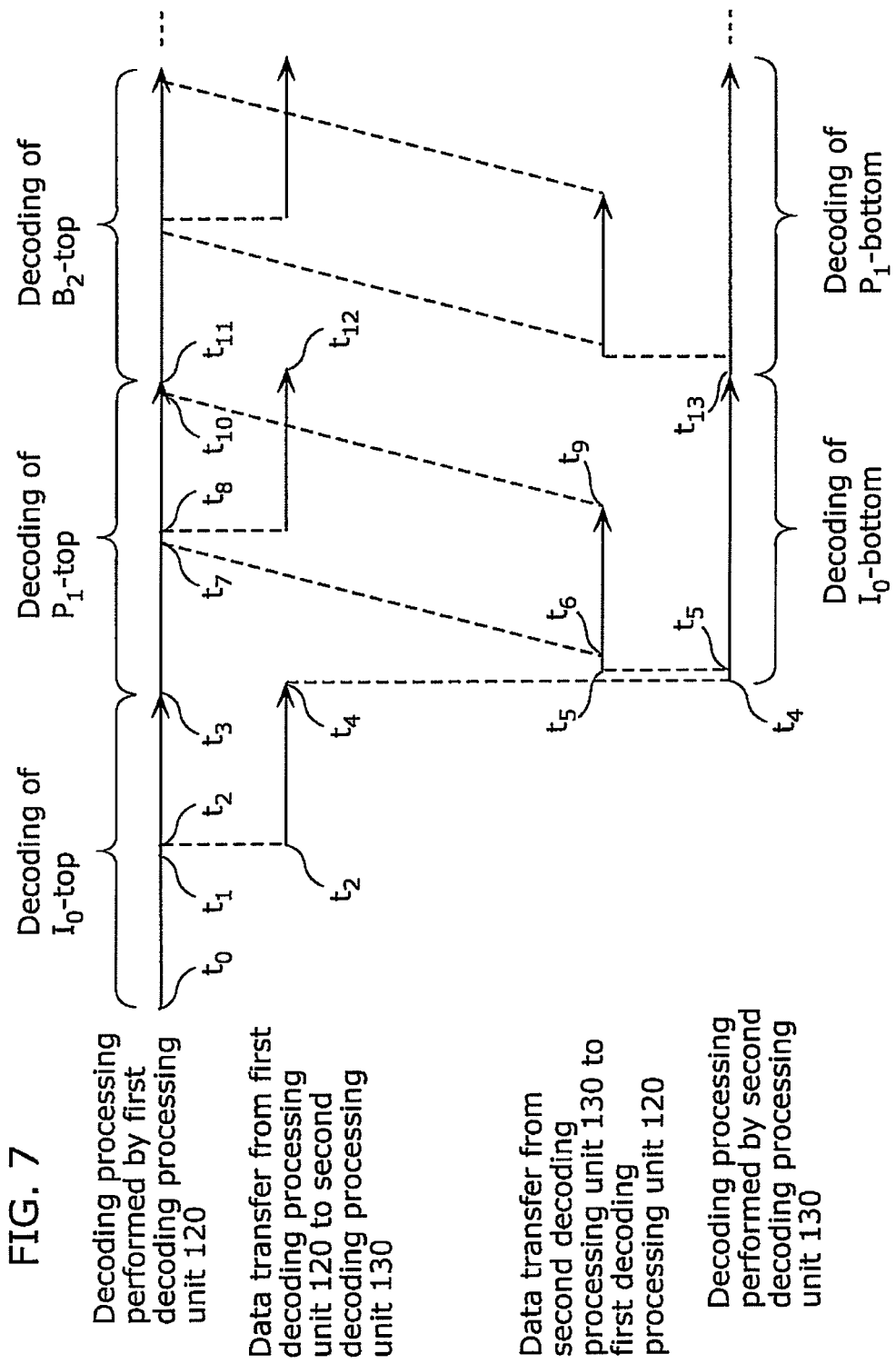
FIG. 7 is a diagram showing timings of processing performed by plural decoding processing units.

FIG. 7 is a diagram showing timings of processing performed by plural decoding processing units.

First, at a time point $t_0$, the first decoding processing unit 120 starts sequential decoding with the left top macroblock in the $I_0$-top. The first decoding processing unit 120 sequentially decodes the respective macroblock lines of the top portion 301a in the $I_0$-top and completes the decoding at a time point $t_1$. The decoded data of the top portion 301a in the $I_0$-top is never be referred to by the second decoding processing unit 130, and thus the $I_0$-top does not need to be transferred to the second decoding processing unit 130.

Next, the first decoding processing unit 120 starts decoding the bottom portion 302a in the $I_0$-top at the time point $t_1$. The decoded data of the bottom portion 302a may be referred to by the second decoding processing unit 130, and thus the decoded data must be transferred to the second decoding processing unit 130. For this, the first decoding processing unit 120 completes, at a time point t2, decoding the highest macroblock line in the bottom portion 302a, and simultaneously with the completion, starts transferring the decoded data of the macroblock line to the second decoding processing unit 130.

Furthermore, the first decoding processing unit 120 decodes the bottom portion 302a of the $I_0$-top, and transfers the generated decoded data in units of a macroblock line to the second decoding processing unit 130. Next, the first decoding processing unit 120 completes decoding all the macroblocks in the $I_0$-top at a time point $t_3$. Simultaneously with the completion, the first decoding processing unit 120 starts sequential decoding with the left top macroblock in the $P_1$-top. Only the $I_0$-top in a picture $I_0$ is referred to in decoding of the top portion 301b in the $P_1$-top, and thus decoding of the top portion 301b in the $P_1$-top can be started irrespective of the progress status of the decoding that is performed by the second decoding processing unit 130.

At a time point $t_4$, the first decoding processing unit 120 completes transferring decoded data of the lowest macroblock line in the $I_0$-top. Since decoded data must be generated prior to the transfer, $t_4 > t_3$ is always satisfied.

The second decoding processing unit 130 receives the decoded data sent from the first decoding processing unit 120 at the time point $t_4$, and it simultaneously starts sequential decoding of the $I_0$-bottom with the left top macroblock. The decoded data of the top portion 303a in the $I_0$-bottom may be referred to by the first decoding processing unit 120, and thus the second decoding processing unit 130 must transfer the decoded data to the first decoding processing unit 120.

The second decoding processing unit 130 completes, at a time point $t_5$, decoding the highest macroblock line in the $I_0$-bottom, and simultaneously with the completion, starts transferring the data of the highest macroblock line to the first decoding processing unit 120. Next, at a time point $t_6$, the second decoding processing unit 130 completes the transfer of the decoded data of the highest macroblock line. Likewise, the second decoding processing unit 130 next decodes the $I_0$-bottom, sequentially transfers the decoded data of the respective macroblock lines of the top portion 303a in the $I_0$-bottom, and at a time point $t_9$, completes the transfer.

The second decoding processing unit 130 completes the decoding of the $I_0$-bottom at a time point $t_{13}$, and simultaneously with the completion, starts decoding the $P_1$-bottom with the left top macroblock. Here, only the bottom portion 302a in the $I_0$-top and the $I_0$-bottom in the picture $I_0$ are referred to in decoding the $P_1$-bottom.

At a time point $t_7$, the first decoding processing unit 120 completes decoding the top portion 301b in the $P_1$-top. Simultaneously with the completion, the first decoding processing unit 120 starts decoding the highest macroblock line of the bottom portion 302b in the $P_1$-top. Here, the first decoding processing unit 120 may refer to the highest macroblock line in the $I_0$-bottom. Thus it is necessary that the time point $t_7$ of starting decoding the highest macroblock line of the bottom portion 302b in the $P_1$-top is subsequent to the time point $t_6$ of completing the transfer of the macroblock line. In short, $t_7 > t_6$ must be satisfied.

If the decoded data of the highest macroblock line in the $I_0$-bottom has not been transferred at the time when the first decoding processing unit 120 has just completed decoding the top portion 301b in the $P_1$-top, the first decoding processing unit 120 temporarily stops the decoding until the transfer is completed. This is the same for the subsequent macroblocks.

In addition, the decoded data of the bottom portion 302b in the $P_1$-top may be referred to by the second decoding processing unit 130 in decoding the $B_2$-bottom, and thus the first decoding processing unit 120 must transfer the decoded data to the second decoding processing unit 130. For this, the first decoding processing unit 120 completes, at a time point $t_8$, decoding the highest macroblock line in the bottom portion 302b, and simultaneously with the completion, starts transferring the decoded data of the macroblock line to the second decoding processing unit 130.

Next, the first decoding processing unit 120 decodes the bottom portion 302b of the $P_1$-top, and transfers the generated decoded data in units of a macroblock line to the second decoding processing unit 130. At a time point $t_{10}$, decoding of the lowest macroblock line in the $P_1$-top is started. The decoded data of the top portion 303a in the $I_0$-bottom must be completely transferred by the time point $t_{10}$. In short, $t_{10} > t_9$ must be satisfied.

Next, the first decoding processing unit 120 completes decoding all the macroblocks in the $P_1$-top at a time point $t_{11}$. Simultaneously with the completion, the first decoding processing unit 120 starts sequential decoding with the left top macroblock in the $B_2$-top. Only the $I_0$-top in the picture $I_0$ and the $P_1$-top in the picture $P_1$ are referred to in decoding the top portion 301c in the $B_2$-top, decoding of the top portion 301c in the $B_2$-top can be started irrespective of the progress status of the decoding performed by the second decoding processing unit 130. Next, at a time point $t_{12}$, the first decoding processing unit 120 completes the transfer of the lowest macroblock line in the $P_1$-top.

Next, a picture B2, picture B3, and picture B4 are decoded in parallel processing as in the same manner.

It is noted that, in an exemplary case where the frame rate of an object bit stream is 30 frames per second (30 fps), real-time decoding processing is possible by keeping, within 1/30 second, the time (from $t_0$ to $t_3$) necessary for the first decoding processing unit 120 to decode the $I_0$-top, the time (from $t_3$ to $t_{11}$) necessary for the first decoding processing unit 120 to decode the $P_1$-top, and the time (from $t_4$ to $t_{13}$) necessary for the second decoding processing unit 130 to decode the $I_0$-bottom, although there is a decoding delay of 1/30 second which is as long as the time to decode the $I_0$-top.

As described earlier, in H.264, motion vectors in the blocks surrounding an object block can be referred to when a motion vector is estimated based on inter-picture prediction. In this case, for example, the decoded data of the bottom portion 302b in the $P_1$-top is required in decoding the top portion 303b in the $P_1$-bottom. Accordingly, as shown in FIG. 7, the first decoding processing unit 120 completes the transfer of the decoded data of the $P_1$-top at a time point $t_{12}$, and at the time point of the completion, the second decoding processing unit 130 starts decoding the $P_1$-bottom. In other words, in the case where the decoded data of the $P_1$-top has not transferred at a time point $t_{13}$ at which the decoding of the $I_0$-bottom is completed ($t_{13} < t_{12}$), the second decoding processing unit 130 must temporarily wait until the decoded data of the $P_1$-top is completely transferred.

However, the first decoding processing unit 120 can immediately start decoding the top half of a next picture at the time point when decoding of the top half of the picture is completed. In this way, it is possible to reduce waiting time until necessary data is transferred.

Next, a description is given of operations of the image decoding device 100 according to this embodiment.

First, when a bit stream is inputted to the image decoding device 100 according to this embodiment, the stream segmentation unit 110 segments the bit stream into two segmented bit streams, and supplies each of the segmented bit streams to a corresponding one of the first decoding processing unit 120 and the second decoding processing unit 130. Each of the first decoding processing unit 120 and second decoding processing unit 130 stores the segmented bit stream into a corresponding one of the stream buffers 121 and 131.

Hereinafter, a description is given of how the respective decoding processing units decode the corresponding segmented bit streams. Here, the description is given of processing performed by the first decoding processing unit 120. The second decoding processing unit 130 performs similar processing.

Figure 8:
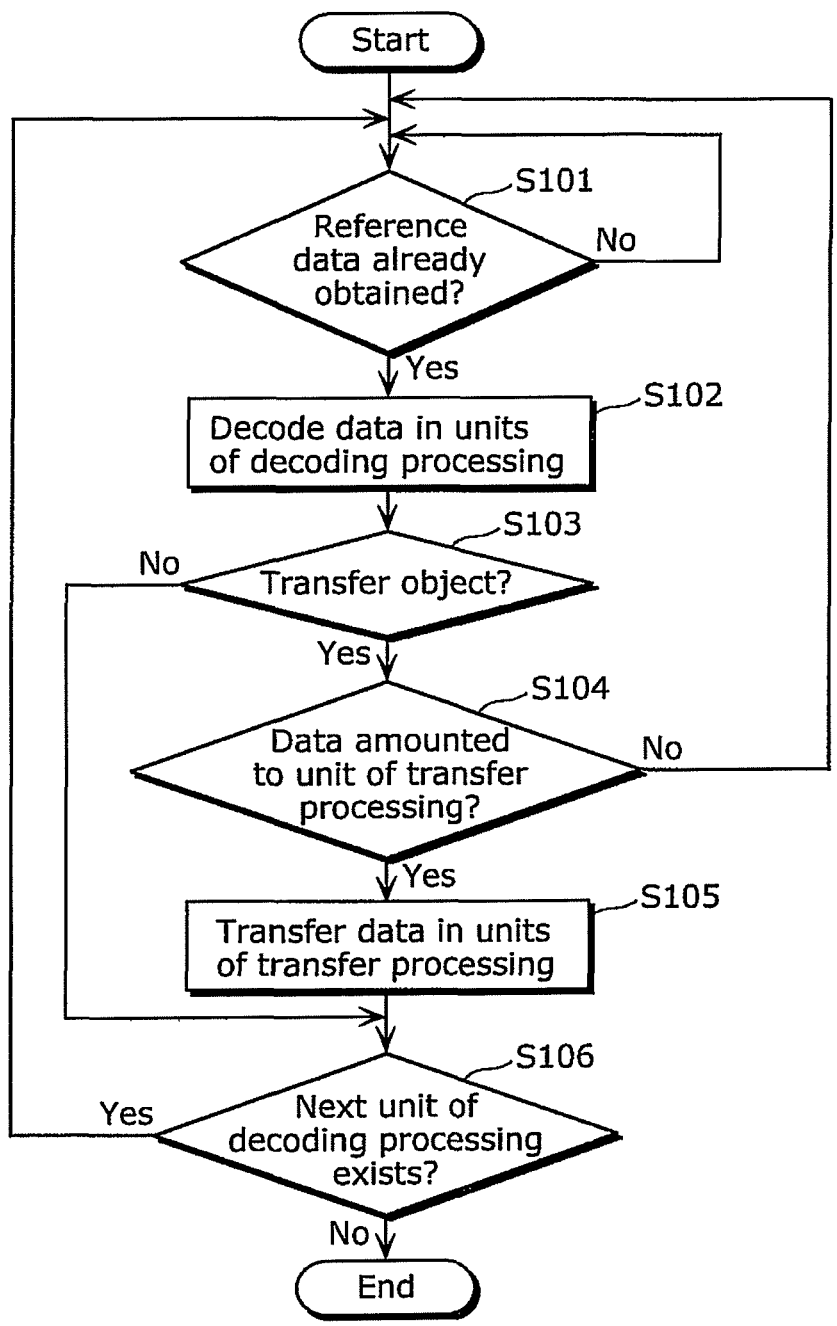
FIG. 8 is a flowchart indicating operations performed by the image decoding device according to the embodiment.

FIG. 8 is a flowchart indicating operations performed by the image decoding device 100 according to the embodiment.

First, the decoding unit 123 reads out a segmented bit stream from the stream buffer 121, obtains control data indicating processing relationships between a unit of decoding processing (for example, an object block to be decoded) included in an object to be decoded and reference data for the unit of decoding processing, and supplies the control data to the decoding determination unit 122. Based on the control data, the decoding determination unit 122 determines whether or not the reference data to be referred to in decoding the unit of decoding processing has been obtained (S101).

More specifically, the decoding determination unit 122 determines whether or not the decoded data generated by the decoding unit 123 and the decoded data that the data transfer unit 125 received from the second decoding processing unit 130 have been stored in the video buffer 126. In the case of decoding the first unit of decoding processing in an intra-coded picture for which other data is not referred to, the decoding determination unit 122 determines that reference data has been obtained.

When it is determined that reference data has not been obtained (No in S101), the decoding determination unit 122 stops decoding the segmented bit stream until all the necessary reference data are obtained.

When it is determined that the reference data has been obtained (Yes in S101), the decoding unit 123 generate decoded data by decoding the object unit of decoding processing (S102). The generated decoded data are stored in the video buffer 126 via the transfer determination unit 124.

Next, the transfer determination unit 124 determines whether or not the decoded data generated by the decoding unit 123 is an object to be transferred (S103). More specifically, based on the control data, the transfer determination unit 124 determines whether or not the decoded data is referred to in decoding processing performed by the second decoding processing unit 130. In the case where the decoded data is referred to, the transfer determination unit 124 determines that the decoded data is an object to be transferred. In the case where there are plural decoding processing units, the transfer determination unit 124 determines at least one of the decoding processing units to be the transfer destination.

In the case where the decoding unit 123 determines that the generated decoded data is the object to be transferred (Yes in S103) and decoded data determined to be transfer objects amounts to a unit of transfer processing (for example, a macroblock line) (Yes in S104), the data transfer unit 125 transfers the decoded data in units of transfer processing to the second decoding processing unit 130 (S105).

In the case where the decoded data determined to be a transfer object does not amount to the unit of transfer processing (No in S104), a next unit of decoding processing is decoded (a return to S101). However, if there is no next unit of decoding processing when the decoded data does not amount to the unit of transfer processing, the data transfer unit 125 transfers the decoded data that has not transferred to the second decoding processing unit 130 (S105).

In the case where the decoding unit 123 determines that the generated decoded data is not a transfer object (No in S103) and there is a next unit of decoding processing (Yes in S106), the decoding unit 123 decodes the next unit of decoding processing (a return to S101). In the case where there is no next unit of decoding processing (No in S106), the decoding processing is finished.

As described above, an object block is decoded in the case where reference data necessary to decode the object block has been obtained. Furthermore, in the case where the decoded data resulting from decoding is referred to by another one of the decoding processing units, the decoded data is transferred to the other decoding processing unit. In this way, the plural decoding processing unit can decode, in parallel, the bit stream while mutually transferring the reference data.

Figure 9:
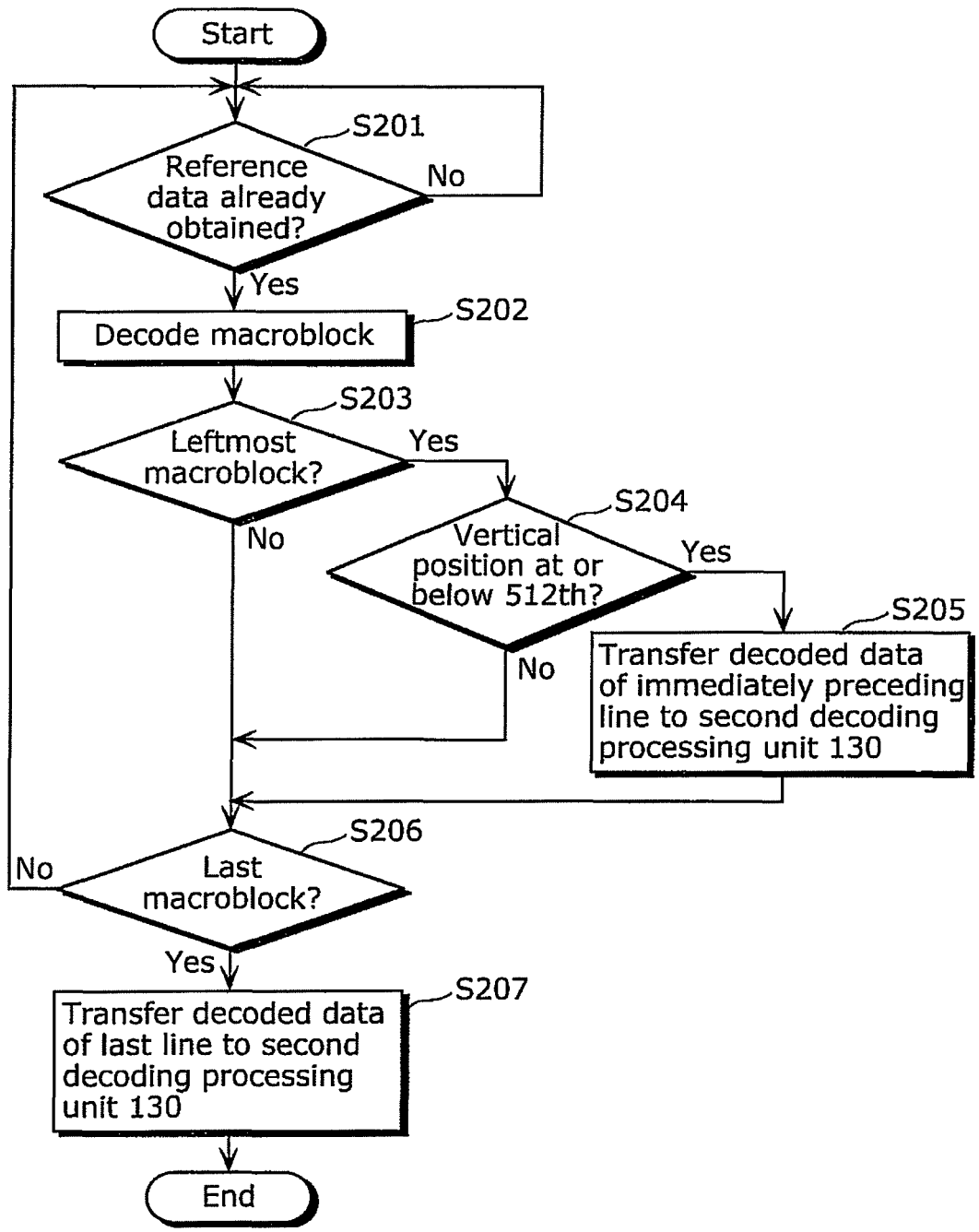
FIG. 9 is a flowchart indicating operations performed by a first image decoding processing unit according to the embodiment.
Figure 10:
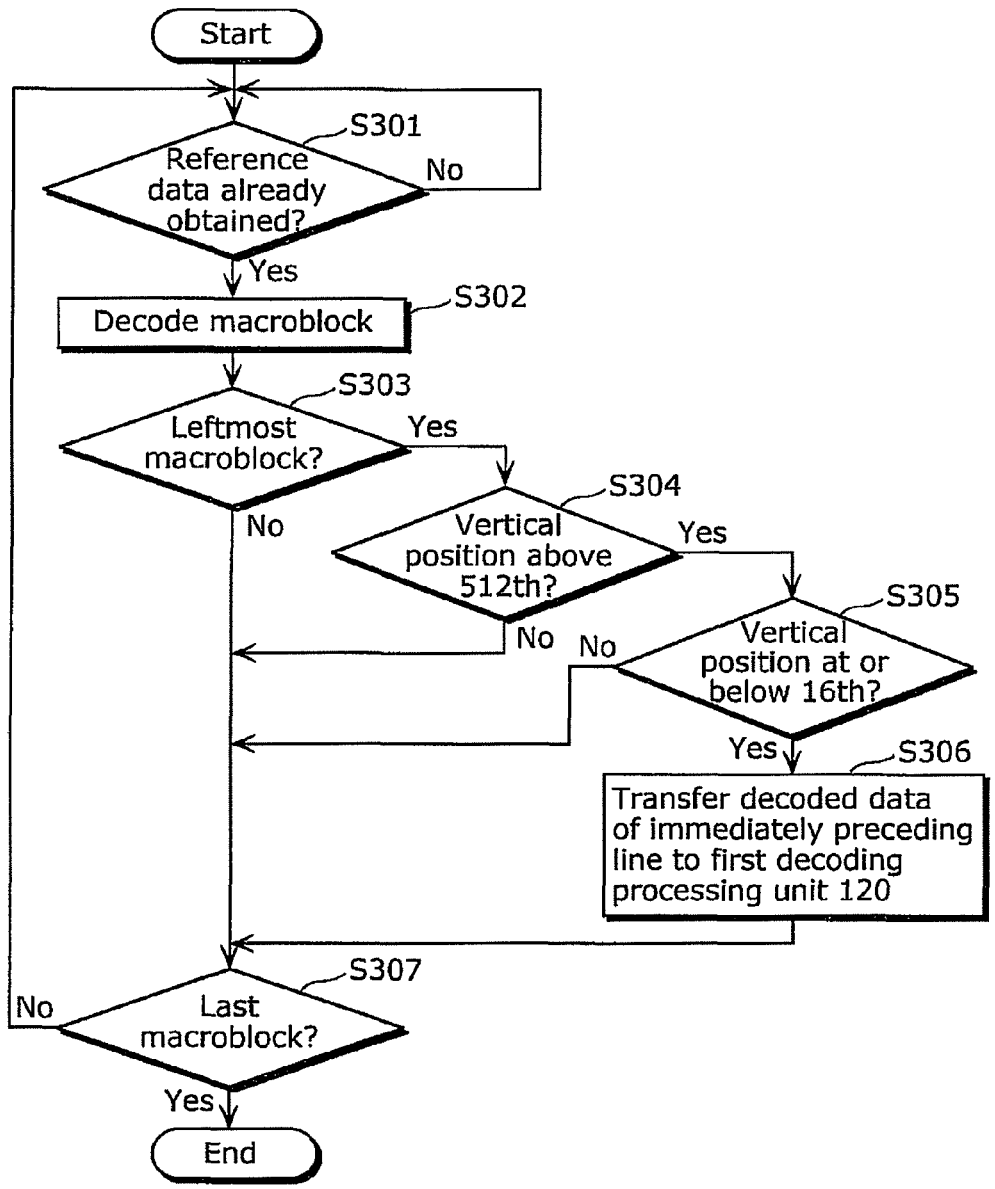
FIG. 10 is a flowchart indicating operations performed by the second image decoding processing unit according to the embodiment.

Next, a description is given of more detailed processing performed by the first decoding processing unit 120 and the second decoding processing unit 130, with reference to FIGS. 9 and 10. The following description is given taking an example case where a coded picture has a resolution of 4096×2048 pixels, and the maximum value in the vertical direction for a motion vector corresponds to 512 pixels. It is assumed that the unit of decoding processing is a macroblock composed of 16×16 pixels, and the unit of transfer processing is a macroblock line.

FIG. 9 is a flowchart indicating operations performed by the first decoding processing unit 120 according to this embodiment.

First, the decoding unit 123 detects an IDR picture for which no preceding picture in a segmented bit stream is referred to in inter-picture prediction processing, and starts decoding the detected IDR picture regarding it as a first I-picture. In the decoding of the I-picture, the picture header, slice header, and macroblocks are decoded in this listed order.

In the decoding of macroblocks, the decoding determination unit 122 determines whether or not the reference data required to decode an object macroblock has been obtained (S201). It is noted that this determination processing (S201) is not necessary for an IDR picture because the first macroblock is decoded without referring to any other picture or macroblock.

When it is determined that reference data has not been obtained (No in S201), the decoding determination unit 122 stops decoding processing by the decoding unit 123 until all the necessary reference data are obtained. When it is determined that reference data has been obtained (Yes in S201), the decoding unit 123 decodes the object macroblock by referring to the reference data (S202).

Next, the transfer determination unit 124 determines whether or not the object decoded macroblock is within a range that may be referred to in inter-picture prediction processing performed by the second decoding processing unit 130. More specifically, first, the transfer determination unit 124 determines whether or not the object decoded macroblock is the leftmost macroblock (S203). In the case where the object macroblock is the leftmost macroblock (Yes in S203), the transfer determination unit 124 further determines whether or not the vertical position of the object macroblock is at or below the 512th pixel line position (S204).

In either the case where the object macroblock is not the leftmost macroblock (No in S203) or the case where the vertical position of the object macroblock is above the 512th pixel line position (No in S204), and in the case where the object macroblock is not the last macroblock (No in S206), the decoding unit 123 decodes a next macroblock regarding it as a new object macroblock (a return to S201).

In the case where the object macroblock is the leftmost macroblock, and the vertical position is at or below the 512th pixel line position (Yes in S204), the data transfer unit 125 transfers the decoded data of the macroblock line immediately preceding the object macroblock to the second decoding processing unit 130 via the data transfer bus 140 (S205).

As described above, the decoding unit 123 sequentially decodes the macroblocks starting with the top leftmost macroblock. When the decoding of the last macroblock is completed (Yes in S206), the data transfer unit 125 transfers the decoded data of the last macroblock line to the second decoding processing unit 130 via the data transfer bus 140 (S207). Next, the first decoding processing unit 120 performs similar processing on a next picture.

As with the Patent Literature 1, this embodiment does not involve modifying the decoding order within a coded picture as described above. In other words, as with conventional techniques, sequential decoding is performed starting with the left top macroblock and along the macroblock lines. When decoding of a macroblock line is finished, the macroblocks in the next macroblock line are sequentially decoded starting with the leftmost macroblock. For this, no complicated control is required, and thus existing decoding circuits can be utilized.

FIG. 10 is a flowchart indicating operations performed by the second decoding processing unit 130 according to this embodiment.

In the decoding of macroblocks, the decoding determination unit 132 determines whether or not the reference data required to decode an object macroblock has been obtained (S301). More specifically, as with the first decoding processing unit 120, the second decoding processing unit 130 starts decoding a bit stream with the IDR pictures. However, decoding processing including intra-picture prediction requires information of macroblocks located above the object macroblock as described above. This information is derived in the decoding performed by the first decoding processing unit 120. Accordingly, the second decoding processing unit 130 determines whether or not control data required for intra-picture prediction among the information decoded by the first decoding processing unit 120 has been transferred via the data transfer bus 140.

When it is determined that the reference data has not been obtained (No in S301), the decoding determination unit 132 stops decoding processing that is performed by the decoding unit 133 until all the necessary reference data are obtained. When it is determined that the reference data has been obtained (Yes in S301), the decoding unit 133 decodes the object macroblock by referring to the reference data (S302).

Next, the transfer determination unit 134 determines whether or not the object decoded macroblock is within a range that may be referred to by the first decoding processing unit 120 in inter-picture prediction processing. More specifically, first, the transfer determination unit 134 determines whether or not the object decoded macroblock is the leftmost macroblock (S303). In the case where the object macroblock is the leftmost macroblock (Yes in S303), the transfer determination unit 134 further determines whether or not the vertical position of the object macroblock is above the 512th pixel line position (S304).

In this embodiment, decoded data are transferred in units of a macroblock line. Thus, in the case where the vertical position is at or below the 16th pixel line position (Yes in S305), in other words, a macroblock line has been obtained, the data transfer unit 135 transfers the decoded data of the macroblock line immediately preceding the object macroblock to the first decoding processing unit 120 via the data transfer bus 140 (S306).

Here are cases where: the object macroblock is not the leftmost macroblock (No in S303); the vertical position of the object macroblock is not above the 512th pixel line position (No in S304); or the vertical position of the object macroblock is above the 16th pixel line position (No in S305). In this case, in the case where the object macroblock is not the last macroblock (No in S307), the decoding unit 123 decodes a next macroblock regarding it as a new object macroblock (a return to S301).

As described above, in the case where the second decoding processing unit 130 sequentially decodes the macroblocks starting with the left top macroblock and ending with the last macroblock (Yes in S307), it decodes a next picture in the similar manner.

As described above, the image decoding device and the image decoding method according to this embodiment makes it possible to reduce waiting time for necessary data transfer. The image decoding device configured in this manner is capable of decoding even coded pictures coded based on intra-picture prediction because decoding is started after reception of not only pixel data necessary for inter-picture prediction but also control data indicating dependencies of units of decoding processing (such as macroblocks). Furthermore, it is possible to reduce the number of times of data transfer, thereby reducing the overhead occurred for inter-communication between decoding processing units.

Not only in the case of inter-picture prediction but also in the case where a coded picture has dependencies based on intra-picture prediction within the coded picture, the image decoding device can decode the coded picture having the dependencies within the coded picture, using conventional decoding circuits, and without deteriorating the efficiency in the parallel processing.

The image decoding device and the image decoding method have been described above based on the embodiment, but the present invention is not limited to the embodiment. The present invention should be interpreted as including various kinds of modifications, to the embodiment, which will be conceived by any person skilled in the art without departing from the scope of the present invention.

For example, the decoding units 123 and 133 may perform decoding in units of a pixel, instead of in units of a macroblock composed of 16×16 pixels as described above. In addition, the size of a macroblock is not limited to 16×16 pixel size, and the size may be other sizes, for example, 8×8, 8×16, 16×8, or the like.

In the above description, data is transferred to the other decoding processing unit in units of a macroblock line (that is, 16-pixel line) via the data transfer bus 140. However, data may be transferred in units of a group of plural lines less than 512 pixel lines or may be transferred in a unit of the 512 pixel lines all together. Otherwise, data may be transferred in units of a slice.

The embodiment has been described taking an example case where each of the coded pictures included in a bit stream is segmented into N areas having a common horizontal axis as the boundary, and each of the N segmented bit streams includes a co-located areas in the respective coded pictures. Not as with this case, the positions of the boundaries in the respective pictures may be different between coded pictures. In addition, each of the N areas may have a different size. The pictures may be segmented in the direction along the vertical axes, or the symmetrical axes as the boundaries. However, the horizontal axes are preferably selected as the boundaries because otherwise dependencies are complicated.

The embodiment has been described taking an example case where two decoding processing units perform parallel decoding processing. However, a greater number of decoding processing units may perform parallel decoding processing in the similar manner. For example, a coded picture may be segmented into three equal-sized areas having two horizontal axes as the boundaries between them.

Figure 11:
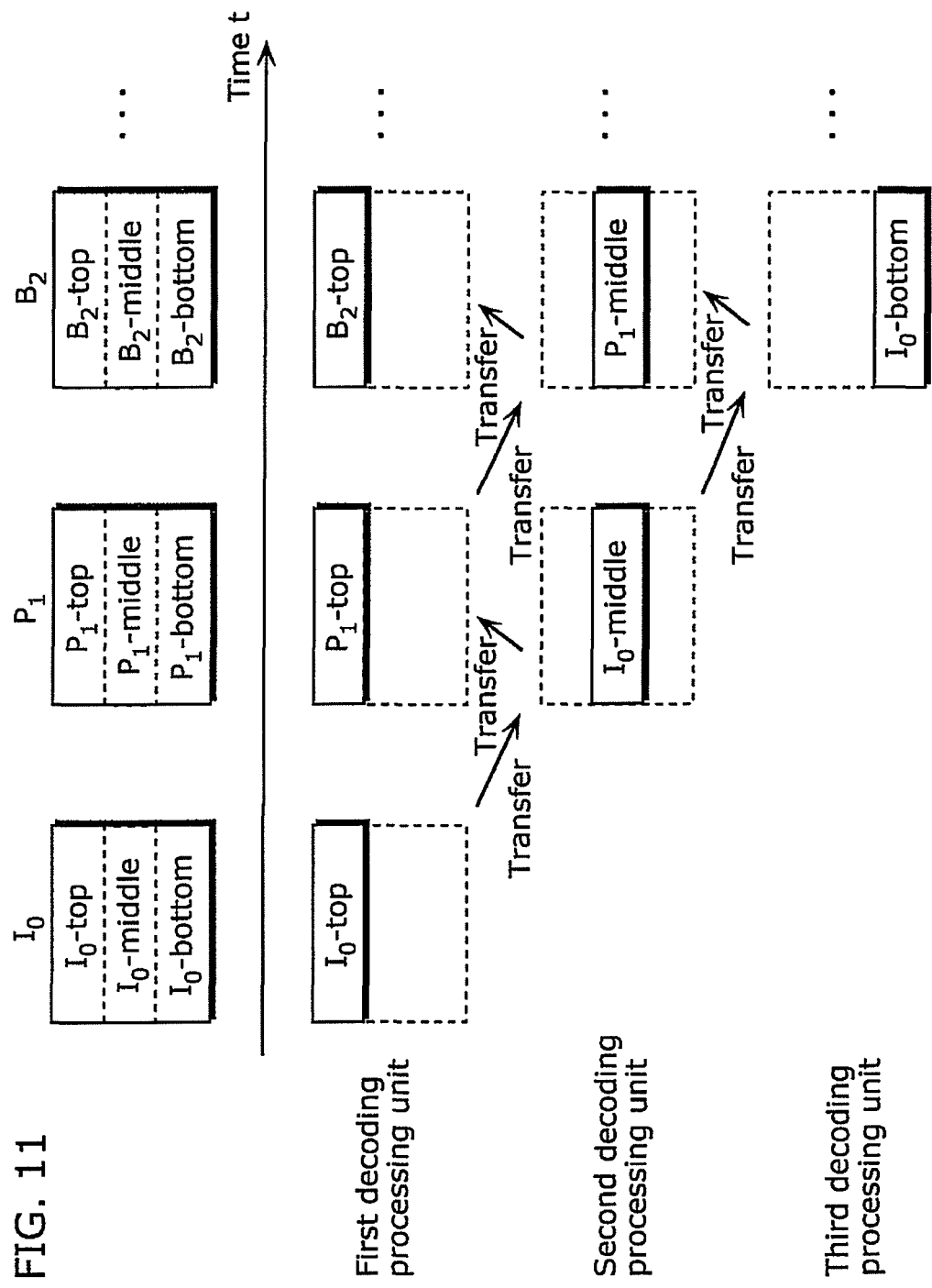
FIG. 11 is a diagram schematically showing a temporal flow of decoding processing in the case where each of pictures is segmented into three areas.

FIG. 11 is a diagram schematically showing a temporal flow of decoding processing in the case where each of pictures is segmented into three areas. As shown in the diagram, the image decoding device performs the parallel processing using three processing units of the first to third decoding processing units.

The first decoding processing unit decodes a segmented bit stream including only the top portions ($I_0$-top, $P_1$-top, $B_2$-top, . . . ) of the coded pictures. The second decoding processing unit decodes a segmented bit stream including only the middle portions ($I_0$-middle, $P_1$-middle, $B_2$-middle, . . . ) of the coded pictures. The third decoding processing unit decodes a segmented bit stream including only the bottom portions ($I_0$-bottom, $P_1$-bottom, $B_2$-bottom, . . . ) of the coded pictures.

Decoded data of the lowest macroblock line in the $I_0$-top is required to decode the highest macroblock line in the $I_0$-middle. Accordingly, at the same time when the decoded data of the lowest macroblock line in the $I_0$-top is completely received, the second decoding processing unit starts decoding the left top macroblock in the $I_0$-middle. For this, as shown in FIG. 11, the first decoding processing unit and the second decoding processing unit make decoding starting timings different by time required to decode a one-thirds of a picture.

Decoded data of the lowest macroblock line in the $I_0$-middle is required to decode the highest macroblock line in the $I_0$-bottom. Accordingly, at the same time when the decoded data of the lowest macroblock line in the $I_0$-middle is completely received, the third decoding processing unit starts decoding the left top macroblock in the $I_0$-bottom. For this, as shown in FIG. 11, the second decoding processing unit and the third decoding processing unit make decoding starting timings different by time required to decode a one-thirds of a picture.

Accordingly, the $I_0$-top, $I_0$-middle, and the $I_0$-bottom are decoded by the different decoding processing units with different decoding time. Likewise, the $P_1$-top, $P_1$-middle, and $P_1$-bottom, and the $B_2$-top, $B_2$-middle, and $B_2$-bottom are decoded by the different decoding processing units in pipeline processing with different decoding time.

As described above, the decoding processing unit that decodes a second area (for example, $I_0$-middle) downward adjacent to a first area (the $I_0$-top) in an intra-coded picture starts the decoding after the last block in the first area is decoded and then transferred. In this way, it is possible to decode a bit stream by making plural decoding processing units perform parallel processing while mutually transferring data. It is noted that how to allocate each of the decoded data to a corresponding one of the decoding processing units is determined by a transfer determination unit of each decoding processing unit.

It is noted that each of the areas preferably has a size equal to or greater than the half of a maximum search range for a motion vector especially in the case of segmenting each coded picture into three or more areas. More specifically, when the number of vertical pixels in a picture is L, the number of segments is N, and the maximum search range for a motion vector is M, the following Expression 1 is satisfied.

$$L/N \geq M/2 \qquad \text{(Expression 1)}$$

For this, the number N of segments is determined to satisfy the following Expression 2.

$$N \leq 2L/M \qquad \text{(Expression 2)}$$

According to this, in FIG. 11 for example, only the areas of $I_0$-middle and $I_0$-bottom are referred to in decoding the $P_1$-bottom based on inter-picture prediction, and the $I_0$-top is never referred to. This eliminates the need to connect the first decoding processing unit and the third decoding processing unit, thereby implementing an image decoding device that is simply configured.

Furthermore, in the case where each of the segmented areas has a size equal to or greater than the maximum search range for a motion vector at this time, the decoded data of a single macroblock is never be referred to by two or more decoding processing units.

The embodiment has been described taking an example case where the decoding processing units transfer data between them via a common bus capable of interactive communication. However, the bus for data transfer may be configured as individual buses that can transfer data in a single direction only. In addition, the means for data transfer are not limited to buses, and a configuration in which plural memory banks are shared by switching or the like is also possible.

The plural decoding processing units may be provided as individual LSIs, or may be configured as a system integrated into a single LSI.

The system configured to have the decoding processing units in this manner makes it possible to horizontally segment each of pictures, mutually transfer data necessary for intra-picture prediction and inter-picture prediction, detect that the necessary data has been obtained, and makes the respective decoding processing units advance processing in parallel decoding processing on the respective segmented areas.

As mentioned above, the present invention may be implemented not only as the image decoding device and the image decoding method, but also as a program for making a computer execute the image decoding method according to the embodiment. Furthermore, the present invention may be implemented as a computer-readable recording medium such as a CD-ROM on which the program is recorded, as information and data indicating the program, and as a signal representing the program. In addition, these program, information, data, and signal may be distributed via communication networks such as the Internet.

It is noted that some or all of the constituent element of the image decoding device according to the present invention may be configured in form of a single system LSI. A system LSI is a super-multi-functional LSI manufactured by integrating plural constituent elements on a single chip, and specifically, a computer system configured to include a micro processor, a ROM and a RAM, and the like.

INDUSTRIAL APPLICABILITY

The image decoding device and image decoding method according to the present invention provides an advantageous effect of making it easier to decode an image having a higher resolution by using plural existing decoding units, and for example, can be used for digital cameras and digital televisions.

The invention claimed is:

1. An image decoding device which decodes a bit stream including a plurality of coded pictures which has been coded based on intra-picture prediction and inter-picture prediction, said image decoding device comprising:
 a stream segmentation unit configured to generate N segmented bit streams by segmenting the bit stream such that each of the plurality of coded pictures is segmented into N areas having N−1 horizontal axis as a boundary, N being an integer equal to or greater than 2; and
 N decoding processing units each of which processes, in parallel, the plurality of mutually different coded pictures by decoding the respective N segmented bit streams generated by said stream segmentation unit,
 wherein each of said N decoding processing units includes:
 a decoding unit configured to generate decoded data including pixel data indicating pixel values and control data indicating dependencies between first units of processing included in the N areas of the plurality of respective coded pictures by decoding a corresponding one of the N segmented bit streams, based on intra-picture prediction and inter-picture prediction, in the first units of processing, and according to predefined processing orders;
 a first determination unit configured to determine whether or not the decoded data generated by said decoding unit is referred to by another one of said N decoding processing units, based on the dependencies between the first units of processing indicated by the control data;
 a data transfer unit configured to send the decoded data in second units of processing to said other decoding processing unit in the case where said first determination unit determines that said other decoding processing unit refers to the decoded data, and to receive decoded data to be sent from said other or another one of said N decoding processing units, the second unit of processing being equal to or larger than the first unit of processing; and
 a second determination unit configured to determine whether or not decoded data to be referred to based on intra-picture prediction and inter-picture prediction either has been generated by said decoding unit or has been received by said data transfer unit,
 said decoding unit is configured to decode the segmented bit stream based on intra-picture prediction and inter-picture prediction by referring to the pixel data of pixels having dependencies with an object first unit of processing, using the control data included in decoded data, in the case where said second determination unit determines that the decoded data has been generated or received,
 a first segmented bit stream among the N segmented bit streams includes a first area among the N areas,
 a second segmented bit stream among the N segmented bit streams includes a second area spatially downward adjacent to the first area,
 a first decoding processing unit among the N decoding processing units is configured to decode the first area of a first coded picture included in the first segmented bit stream, and
 a second decoding processing unit among the N decoding processing units is configured to decode the second area of a second coded picture which is located temporally before the first coded picture and included in the second segmented bit stream, while said first decoding processing unit is decoding the first area.

2. The image decoding device according to claim 1,
 wherein each of the N areas has a size equal to or greater than a half of a maximum search range in which a motion vector is searched by said decoding processing unit in the decoding based on inter-picture prediction.

3. The image decoding device according to claim 2,
 wherein said data transfer unit included in said second decoding processing unit is configured to receive at least a part of the decoded data that is obtained by decoding the first area and is sent from said first decoding processing unit,
 said second determination unit included in said second decoding processing unit is configured to determine whether or not the decoded data generated by decoding a last first unit of processing in the first area of the coded picture has been received, and
 said decoding unit included in said second decoding processing unit is configured to start decoding the second area of the coded picture, in the case where it is determined that the decoded data generated by decoding the last first unit of processing in the first area has been received.

4. The image decoding device according to claim 3,
 wherein said first determination unit is configured to determine that the decoded data generated by said decoding unit is referred to by said other decoding processing unit, in the case where the decoded data includes (i) the control data indicating dependencies with another one of the N areas and (ii) at least one of pixel data of pixels that are referred to based on the dependencies with the other area, when said other decoding processing unit decodes, based on intra-picture prediction, the other area of the coded picture included in another one of the N segmented bit streams.

5. The image decoding device according to claim 4,
 wherein said first determination unit is configured to determine that the decoded data generated by said decoding unit is referred to by said other decoding processing unit, in the case where the decoded data includes pixel data of pixels located within a search range in which a motion vector is searched, when said other decoding processing unit decodes, based on inter-picture prediction, another one of the N areas of the coded picture included in another one of the N segmented bit streams.

6. The image decoding device according to claim 5,
 wherein said second determination unit is configured to determine whether or not all of the decoded data including (i) the control data indicating dependencies with the object first unit of processing that is decoded by said decoding unit and (ii) at least one of pixel data of the pixels having dependencies with the object first unit of processing either has been generated by said decoding unit or has been received by said data transfer unit.

7. The image decoding device according to claim 6,
 wherein said stream segmentation unit is configured to generate the N segmented bit streams by segmenting the bit stream such that each of the plurality of coded pictures is segmented into N equal-sized areas.

8. The image decoding device according to claim 7, further comprising
 a storage unit configured to store the decoded data generated by said decoding unit and the decoded data received by said data transfer unit,
 wherein said second determination unit is configured to determine whether or not the decoded data to be referred to based on intra-picture prediction and inter-picture prediction has been stored in said storage unit, and said decoding unit is configured to decode the bit stream in the case where said second determination unit determines that the decoded data has been stored in said storage unit.

9. The image decoding device according to claim 8,
wherein each of the first units of processing is a macroblock included in the coded picture, and
each of the second units of processing is a macroblock line included in the coded picture.

10. An image decoding method of decoding a bit stream including a plurality of coded pictures which has been coded based on intra-picture prediction and inter-picture prediction, said image decoding method comprising:
generating N segmented bit streams by segmenting the bit stream such that each of the plurality of coded pictures is segmented into N areas having N−1 horizontal axis as a boundary, N being an integer equal to or greater than 2; and
making N decoding processing units process, in parallel, the plurality of mutually different coded pictures by decoding the respective N segmented bit streams generated by the stream segmentation unit,
wherein said decoding includes:
generating decoded data including pixel data indicating pixel values and control data indicating dependencies between first units of processing included in the N areas of the plurality of respective coded pictures by decoding each of the N segmented bit streams, based on intra-picture prediction and inter-picture prediction, in the first units of processing, and according to predefined processing orders;
firstly determining whether or not the decoded data generated in said decoding is referred to by another one of the N decoding processing units, based on the dependencies between the first units of processing indicated by the control data;
sending the decoded data in second units of processing to the other decoding processing unit in the case where it is determined in said first determining that the decoded data is referred to, and receiving decoded data to be sent from the other or another one of the N decoding processing units, the second unit of processing being equal to or larger than the first unit of processing; and
secondly determining whether or not decoded data to be referred to based on intra-picture prediction and inter-picture prediction either has been generated in said decoding or has been received in said sending,
in said decoding, the segmented bit stream is decoded based on intra-picture prediction and inter-picture prediction by referring to the pixel data of pixels having dependencies with an object first unit of processing, using the control data included in decoded data, in the case where it is determined in said second determining that the decoded data has been generated or received,
a first segmented bit stream among the N segmented bit streams includes a first area among the N areas,
a second segmented bit stream among the N segmented bit streams includes a second area spatially downward adjacent to the first area,
a first decoding processing unit among the N decoding processing units is configured to decode the first area of a first coded picture included in the first segmented bit stream, and
a second decoding processing unit among the N decoding processing units is configured to decode the second area of a second coded picture which is located temporally before the first coded picture and included in the second segmented bit stream, while the first decoding processing unit is decoding the first area.

11. An image decoding device which decodes a bit stream including a plurality of coded pictures which has been coded based on intra-picture prediction and inter-picture prediction, said image decoding device comprising:
a stream segmentation unit configured to generate N segmented bit streams by segmenting the bit stream such that each of the plurality of coded pictures is segmented into N areas having N−1 horizontal axis as a boundary, N being an integer equal to or greater than 2; and
N decoding processing units each of which processes, in parallel, the plurality of mutually different coded pictures by decoding the respective N segmented bit streams generated by said stream segmentation unit,
wherein each of said N decoding processing units includes:
a decoding unit configured to generate decoded data including pixel data indicating pixel values and control data indicating dependencies between first units of processing included in the N areas of the plurality of respective coded pictures by decoding a corresponding one of the N segmented bit streams, based on intra-picture prediction and inter-picture prediction, in the first units of processing, and according to predefined processing orders;
a first determination unit configured to determine whether or not the decoded data generated by said decoding unit is referred to by another one of said N decoding processing units, based on the dependencies between the first units of processing indicated by the control data;
a data transfer unit configured to send the decoded data in second units of processing to said other decoding processing unit in the case where said first determination unit determines that said other decoding processing unit refers to the decoded data, and to receive decoded data to be sent from said other or another one of said N decoding processing units, the second unit of processing being equal to or larger than the first unit of processing; and
a second determination unit configured to determine whether or not decoded data to be referred to based on intra-picture prediction and inter-picture prediction either has been generated by said decoding unit or has been received by said data transfer unit,
said decoding unit is configured to decode the segmented bit stream based on intra-picture prediction and inter-picture prediction by referring to the pixel data of pixels having dependencies with an object first unit of processing, using the control data included in decoded data, in the case where said second determination unit determines that the decoded data has been generated or received,
a first segmented bit stream among the N segmented bit streams includes a first area among the N areas,
a second segmented bit stream among the N segmented bit streams includes a second area spatially downward adjacent to the first area,
a first decoding processing unit among the N decoding processing units is configured to decode the first area of a first coded picture included in the first segmented bit stream, and
a second decoding processing unit among the N decoding processing units is configured to decode the second area of a second coded picture which is located temporally before the first coded picture and included in the second segmented bit stream, while said first decoding processing unit is decoding the first area.

12. A non-transitory computer-readable medium having a program stored thereon for making a computer execute an image decoding method of decoding a bit stream including a plurality of coded pictures which has been coded based on intra-picture prediction and inter-picture prediction, the image decoding method comprising:

generating N segmented bit streams by segmenting the bit stream such that each of the plurality of coded pictures is segmented into N areas having N−1 horizontal axis as a boundary, N being an integer equal to or greater than 2; and processing, in parallel, the plurality of mutually different coded pictures by making N decoding processing units decode the respective N segmented bit streams generated by the stream segmentation unit, wherein the decoding includes:

generating decoded data including pixel data indicating pixel values and control data indicating dependencies between first units of processing included in the N areas of the plurality of respective coded pictures by decoding each of the N segmented bit streams, based on intra-picture prediction and inter-picture prediction, in the first units of processing, and according to predefined processing orders;

firstly determining whether or not the decoded data generated in the decoding is referred to by another one of the N decoding processing units, based on the dependencies between the first units of processing indicated by the control data;

sending the decoded data in second units of processing to the other decoding processing unit in the case where it is determined in the first determining that the decoded data is referred to, and receiving decoded data to be sent from the other or another one of the N decoding processing units, the second unit of processing being equal to or larger than the first unit of processing; and secondly determining whether or not decoded data to be referred to based on intra-picture prediction and inter-picture prediction either has been generated in the decoding or has been received in the sending, in the decoding, the segmented bit stream is decoded based on intra-picture prediction and inter-picture prediction by referring to the pixel data of pixels having dependencies with an object first unit of processing, using the control data included in decoded data, in the case where it is determined in the second determining that the decoded data has been generated or received, a first segmented bit stream among the N segmented bit streams includes a first area among the N areas, a second segmented bit stream among the N segmented bit streams includes a second area spatially downward adjacent to the first area, a first decoding processing unit among the N decoding processing units is configured to decode the first area of a first coded picture included in the first segmented bit stream, and a second decoding processing unit among the N decoding processing units is configured to decode the second area of a second coded picture which is located temporally before the first coded picture and included in the second segmented bit stream, while the first decoding processing unit is decoding the first area.

* * * * *